(12) United States Patent
Ao

(10) Patent No.: US 11,632,028 B2
(45) Date of Patent: Apr. 18, 2023

(54) ELECTROMAGNETIC ACTUATOR AND VIBRATION APPLICATION MECHANISM INCLUDING THE SAME

(71) Applicant: HOSIDEN CORPORATION, Yao (JP)

(72) Inventor: Hitoshi Ao, Yao (JP)

(73) Assignee: HOSIDEN CORPORATION, Yao (JP)

( * ) Notice: Subject to any disclaimer, the term of this patent is extended or adjusted under 35 U.S.C. 154(b) by 136 days.

(21) Appl. No.: 17/106,709

(22) Filed: Nov. 30, 2020

(65) Prior Publication Data

US 2021/0184552 A1   Jun. 17, 2021

(30) Foreign Application Priority Data

Dec. 16, 2019  (JP) .............................. JP2019-226080

(51) Int. Cl.
*H01F 7/14* (2006.01)
*H02K 33/16* (2006.01)

(52) U.S. Cl.
CPC .............. *H02K 33/16* (2013.01); *H01F 7/14* (2013.01)

(58) Field of Classification Search
CPC ....................................................... H02K 33/16
USPC ..................................... 310/15; 335/128, 276
See application file for complete search history.

(56) References Cited

U.S. PATENT DOCUMENTS

| 775,145 | A | * | 11/1904 | Meyer | ..................... | H01H 50/30 335/124 |
| 972,814 | A | * | 10/1910 | Cadell | ..................... | H01H 51/06 335/128 |
| 1,119,131 | A | * | 12/1914 | Webster | ................. | H01H 51/06 335/128 |
| 1,753,180 | A | * | 4/1930 | Whittingham | ......... | H01H 51/10 361/194 |

(Continued)

FOREIGN PATENT DOCUMENTS

| EP | 2 768 004 A1 | 8/2014 |
| JP | 2004-202424 A | 7/2004 |
| JP | 2016-95548 A | 5/2016 |

OTHER PUBLICATIONS

Extended Eiropean Search Report with EPO Communication and attachments, for European Patent Application No. 20213893.9, dated May 18, 2021 (17 pages).

*Primary Examiner* — Alexander Talpalatski
(74) *Attorney, Agent, or Firm* — Kilyk & Bowersox, P.L.L.C.

(57) ABSTRACT

An electromagnetic actuator including an attractor to exert a magnetic attractive force in one side in a first direction, a frame, and a lever. The frame includes a frame body fixed to the attractor, and a support on an oblique-direction side relative to the attractor. The lever includes a fulcrum portion pivotally supported by the support, a first displaceable portion arranged on the other side in the second direction relative to the fulcrum portion and on the other side in the first direction relative to the attractor and magnetically (Continued)

attractable by the attractor to be displaced to the one side in the first direction, and a second displaceable portion arranged on the one side in the first direction relative to the fulcrum portion and on the one side in the second direction relative to the attractor and/or the frame and displaceable away from the attractor and/or the frame by the pivot of the lever.

18 Claims, 11 Drawing Sheets

(56) References Cited

U.S. PATENT DOCUMENTS

| | | | | |
|---|---|---|---|---|
| 1,925,997 | A * | 9/1933 | Barkham | H01H 50/16 335/279 |
| 2,037,662 | A * | 4/1936 | Kurz | H01H 50/28 335/188 |
| 2,111,541 | A * | 3/1938 | Armstrong | H01H 50/88 335/239 |
| 3,164,758 | A * | 1/1965 | Siefert | G04C 1/022 335/277 |
| 3,307,130 | A * | 2/1967 | Camp | H01H 71/345 335/258 |
| 3,365,683 | A * | 1/1968 | Aidn | H01H 50/26 335/274 |
| 3,437,962 | A * | 4/1969 | Bell | H01H 50/26 335/276 |
| 4,061,994 | A * | 12/1977 | Minks | H01H 50/26 335/202 |
| 4,131,865 | A * | 12/1978 | Hart | H01H 50/22 335/277 |
| 4,238,749 | A * | 12/1980 | Lawson | H01H 71/345 335/63 |
| 4,504,807 | A * | 3/1985 | Nar | H01H 71/345 335/239 |
| 4,845,451 | A * | 7/1989 | Uetsuhara | H01F 7/1607 335/277 |
| 5,852,392 | A * | 12/1998 | Aharonian | H01H 50/24 335/78 |
| 5,921,134 | A | 7/1999 | Shiba et al. | |
| 6,407,653 | B1 * | 6/2002 | Zindler | H01H 71/7463 335/38 |
| 2004/0090295 | A1 * | 5/2004 | Yajima | F16F 15/03 335/229 |
| 2017/0315617 | A1 | 11/2017 | Nakao | |

* cited by examiner

ELECTROMAGNETIC ACTUATOR AND VIBRATION APPLICATION MECHANISM INCLUDING THE SAME

CROSS-REFERENCE TO RELATED APPLICATION

The present application claims priority under 35 U.S.C. § 119 of Japanese Patent Application No. 2019-226080 filed on Dec. 16, 2019, the disclosure of which is expressly incorporated by reference herein in its entirety.

BACKGROUND OF THE INVENTION

Technical Field

The invention relates to electromagnetic actuators and vibration application mechanisms including the electromagnetic actuators.

Background Art

JP 2016-95548 A discloses a conventional vibration application mechanism including a touch panel, a piezoelectric element, a conversion unit, and a housing. The touch panel is fixed to the housing, and an actuator and the conversion unit are accommodated inside the housing. A rotation shaft is provided inside the housing. Applying voltage to, and stopping applying voltage to, the piezoelectric element causes the piezoelectric element to expand and contract, respectively, in the longitudinal direction of the housing. The conversion unit is pivotally supported by the rotation shaft and has an effort portion and a load applicating portion. The expanding and contracting piezoelectric element intermittently presses the effort portion of the conversion unit so as to rotate the conversion unit, so that the load applicating portion of the conversion unit reciprocates in a direction substantially orthogonal to the longitudinal direction so as to intermittently press and thereby vibrate the touch panel.

SUMMARY OF INVENTION

The load applicating portion of the conversion unit is located farther from the piezoelectric element than the effort portion of the conversion unit. In other words, the piezoelectric element and the unit portion are arranged side by side along the longitudinal direction and therefore required to be large sized.

The invention provides a downsized electromagnetic actuator and a vibration application mechanism including the electromagnetic actuator.

An electromagnetic actuator of an aspect of the invention includes a magnetic attractor, a frame, and a lever. The magnetic attractor is configured to exert a magnetic attractive force in one side in a first direction. The frame includes a frame body fixed to the magnetic attractor, and a support. The support is located on an oblique-direction side relative to the magnetic attractor. The oblique direction includes components of the other side in the first direction and one side in a second direction. The second direction is substantially orthogonal to the first direction. The lever includes a fulcrum portion, a first displaceable portion, and a second displaceable portion. The fulcrum portion of the lever is pivotally supported by the support of the frame. The first displaceable portion of the lever is constituted at least partly by a magnetic substance. The first displaceable portion is arranged on the other side in the second direction relative to the fulcrum portion and on the other side in the first direction relative to the magnetic attractor. The second displaceable portion of the lever is arranged on the one side in the first direction relative to the fulcrum portion and on the one side in the second direction relative to at least one of the magnetic attractor or the frame. The first displaceable portion is configured to be magnetically attracted by the magnetic attractor and displaced to the one side in the first direction to cause the lever to make a first pivotal movement about the fulcrum portion, and to cause the second displaceable portion to make a displacement to the one side in the second direction, away from at least one of the magnetic attractor or the frame.

The above electromagnetic actuator can be downsized for the following reason. The first displaceable portion of the lever is arranged on the other side in the first direction relative to the magnetic attractor, and the second displaceable portion of the lever is arranged on the one side in the second direction relative to at least one of the magnetic attractor or the frame. In other words, the second displaceable portion of the lever is so arranged as to overlap at least one of the magnetic attractor or the frame in the second direction. The thus configured electromagnetic actuator is downsized in the dimension in the first direction.

A first distance may be larger than a second distance. In other words, the second distance may be smaller than the first distance. The first distance may be a distance from a central axis of the fulcrum portion to an end on the other side in the second direction of the first displaceable portion. The second distance may be a distance from the central axis of the fulcrum portion to an end on the one side in the first direction of the second displaceable portion. The first distance may be larger than the second distance. In other words, the second distance may be smaller than the first distance.

The magnetic attractor may include an electromagnetic coil.

The magnetic attractor may further include at least one of first to fifth yokes. The first yoke may be received in the electromagnetic coil. The second yoke may be arranged on the one side in the first direction relative to the electromagnetic coil. The third yoke may be arranged on the one side in a third direction relative to the electromagnetic coil. The fourth yoke may be arranged on the other side in the third direction relative to the electromagnetic coil. The fifth yoke may be arranged on the other side in the first direction relative to the electromagnetic coil. The third direction may be substantially orthogonal to the first and second directions.

The first yoke may extend in the first direction, be received in the electromagnetic coil, and include a protrusion. The third yoke may extend in the first direction and include a protrusion. The fourth yoke may extend in the first direction and include a protrusion. Each of the protrusions may be located on the other side in the first direction relative to the magnetic coil.

Where one or more of the protrusions are provided, the first displaceable portion may be arranged on the other side in the first direction relative to the protrusion or protrusions. Where the fifth yoke is provided, the first displaceable portion may be arranged on the other side in the first direction relative to the fifth yoke. Where no protrusions are provided, or alternatively where the fifth yoke is not provided, the first displaceable portion may be arranged on the other side in the first direction relative to the electromagnetic coil.

Where one or more of the protrusions are provided, the second displaceable portion may be arranged on the one side in the second direction relative to the protrusion or protrusions and on the other side in the first direction relative to the electromagnetic coil. Where the fifth yoke is provided, the second displaceable portion may be arranged on the one side in the second direction relative to the fifth yoke and on the other side in the first direction relative to the electromagnetic coil. The second displaceable portion may be arranged on the one side in the second direction relative to the electromagnetic coil.

The frame may further include a protector. The protector may be arranged between one or more of the protrusions and the second displaceable portion, between the fifth yoke and the second displaceable portion, between the support and the electromagnetic coil, or between the electromagnetic coil and the second displaceable portion.

Where the protector is located between the support and the electromagnetic coil in the first direction, and where none of the first to fifth yokes is provided on the other side in the second direction relative to the protector, the second displaceable portion may be arranged on the one side in the second direction relative to the protector and on the other side in the first direction relative to the electromagnetic coil.

A vibration application mechanism according to an aspect of the invention includes the electromagnetic actuator of any of the above aspects and a vibratable part. The electromagnetic actuator may be configured such that the first displaceable portion is magnetically attracted intermittently by the magnetic attractor to intermittently cause the first pivotal movement of the lever and the displacement of the second displaceable portion, and that the second displaceable portion directly or indirectly presses the vibratable part from the other side in the second direction to apply vibration to the vibratable part.

The vibration application mechanism may be configured such that, when the magnetic attractor has ceased to exert the magnetic attraction, the vibratable part directly or indirectly presses the second displaceable portion from the one side in the second direction, so that the second displaceable portion moves back to the other side in the second direction, the lever makes a second pivotal movement about the fulcrum portion in a direction opposite to the first pivotal movement, and the first displaceable portion moves back to the other side in the first direction.

The vibration application mechanism of any of the above aspects may further include a pressor interposed between the vibratable part and the second displaceable portion.

The pressor may be made of an elastic material or may be made of a rigid material, such as a metal or a synthetic resin.

Where the pressor is made of an elastic material, the vibration application mechanism may be configured such that when the first displaceable portion is magnetically attracted by the magnetic attractor, the second displaceable portion makes the displacement so as to compress the pressor between the vibratable part and the second displaceable portion, and when the magnetic attractor has ceased to exert the magnetic attraction, the pressor restores itself, the second displaceable portion moves back to the other side in the second direction, the lever makes a second pivotal movement about the fulcrum portion in a direction opposite to the first pivotal movement, and the first displaceable portion moves back to the other side in the first direction.

The vibratable part may include a touch sensor. In this case, the second displaceable portion may have an amount of displacement of 0.3 mm or less.

Figure 1A:
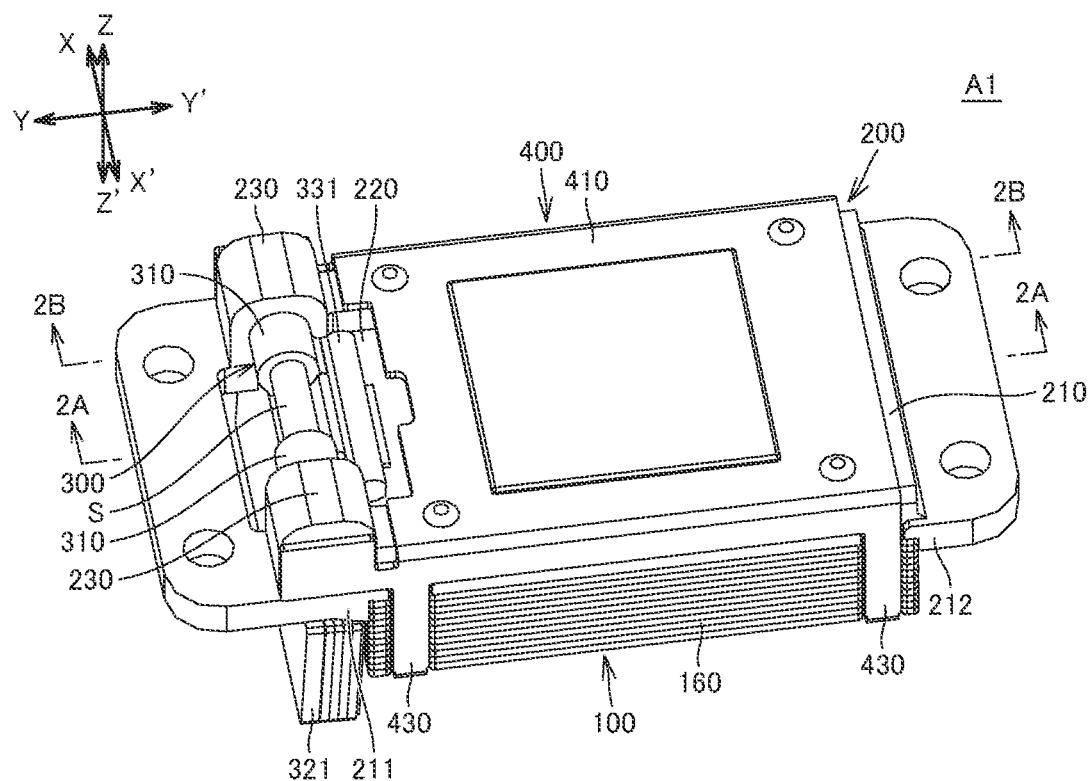
FIG. 1A is a perspective view of an electromagnetic actuator according to a first embodiment of the invention as viewed from the front, the top, and the right side.
Figure 1B:
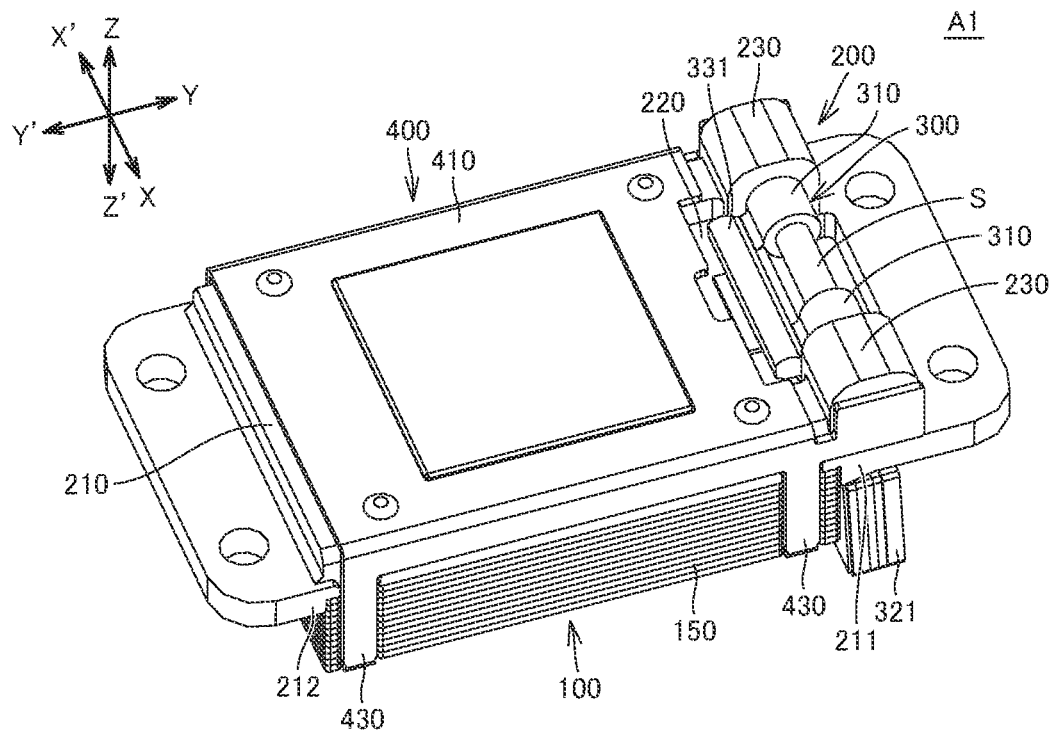
FIG. 1B is a perspective view of the electromagnetic actuator as viewed from the back, the top, and the left side.
Figure 1C:
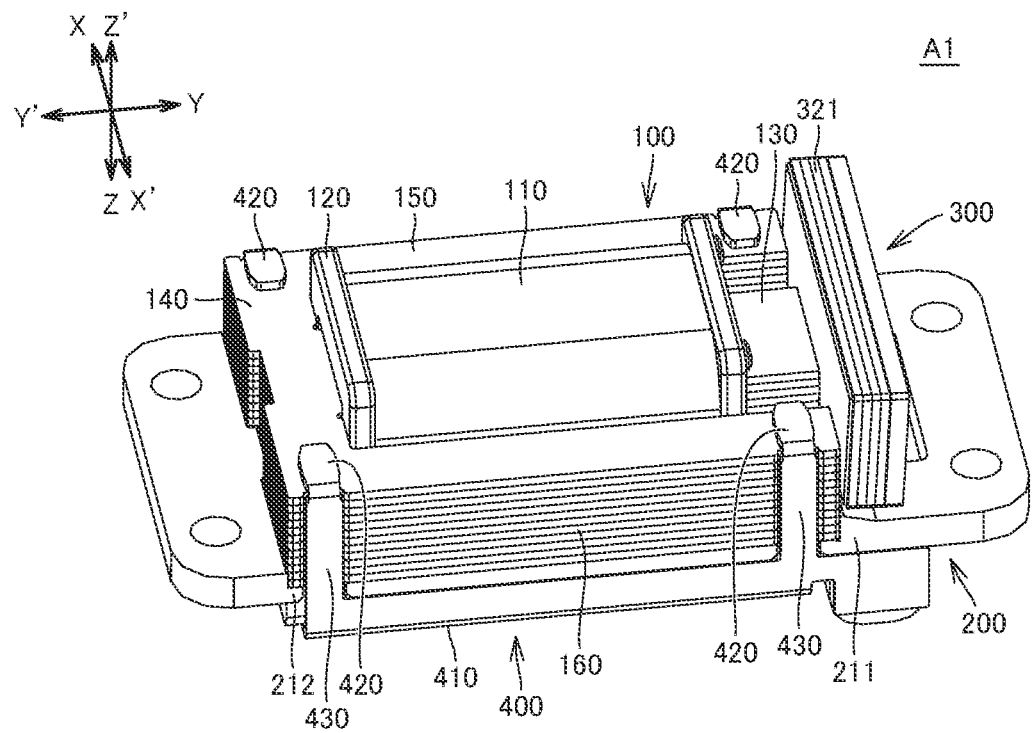
FIG. 1C is a perspective view of the electromagnetic actuator as viewed from the back, the bottom, and the right side.
Figure 2A:
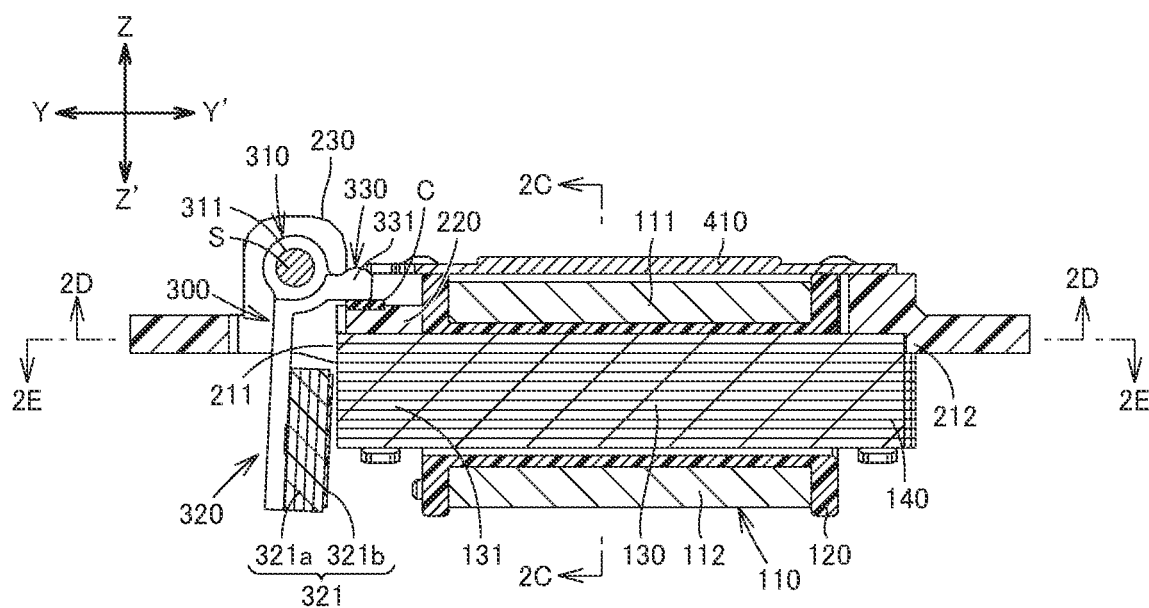
FIG. 2A is a sectional view of the electromagnetic actuator taken along a line 2A-2A in FIG. 1A.
Figure 2B:
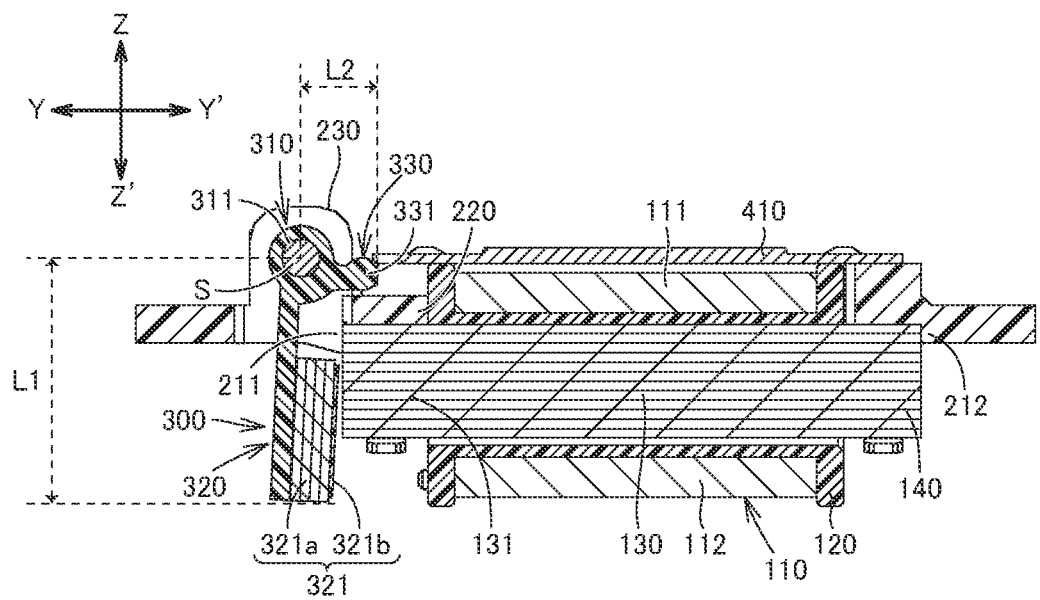
FIG. 2B is a sectional view of the electromagnetic actuator taken along a line 2B-2B in FIG. 1A.
Figure 2C:
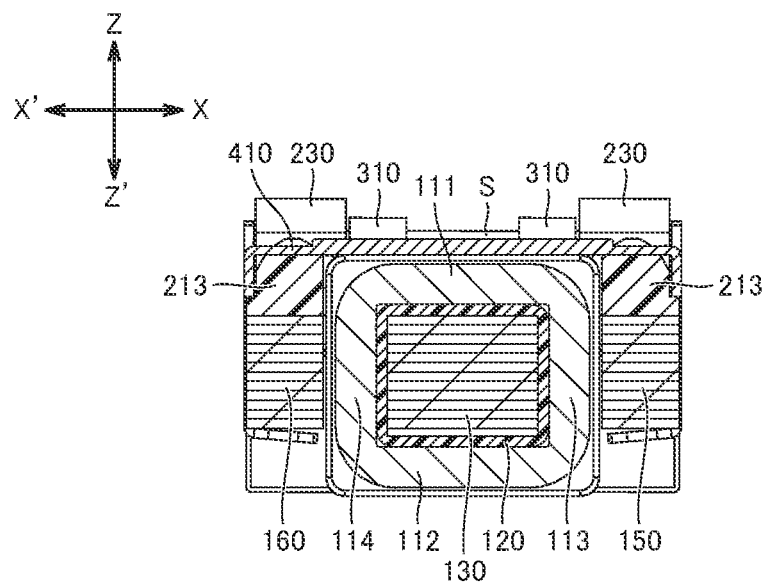
FIG. 2C is a sectional view of the electromagnetic actuator taken along a line 2C-2C in FIG. 2A.
Figure 2D:
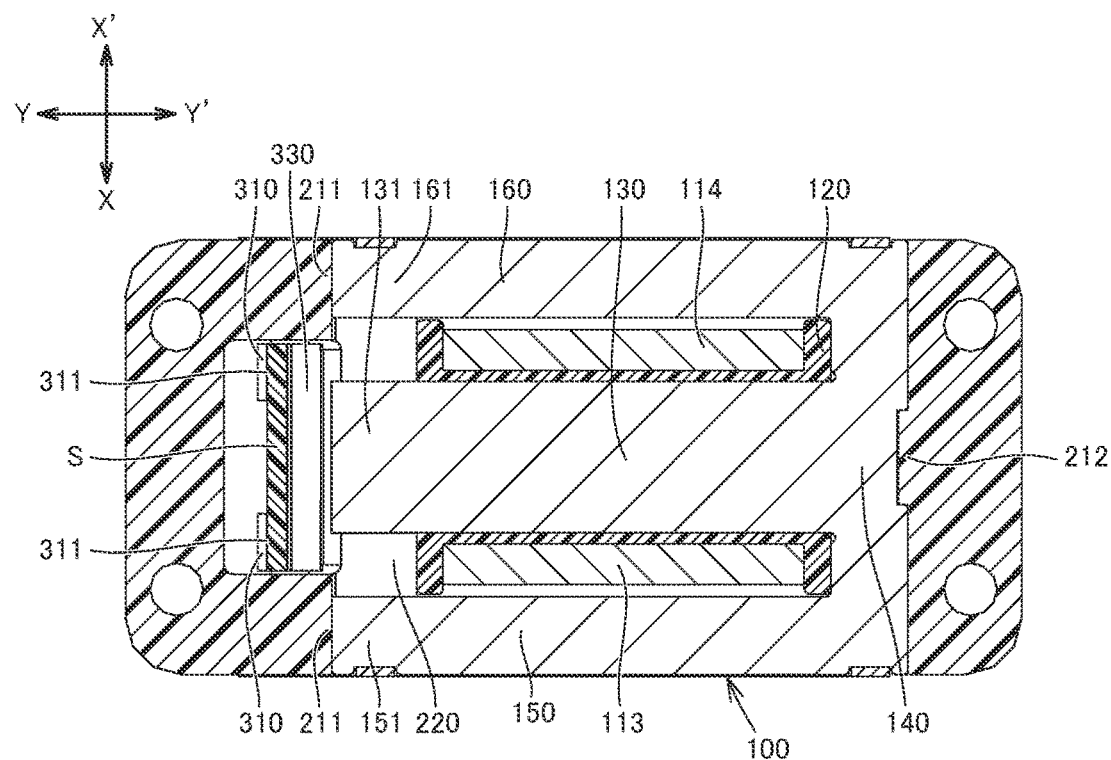
FIG. 2D is a sectional view of the electromagnetic actuator taken along a line 2D-2D in FIG. 2A.
Figure 2E:
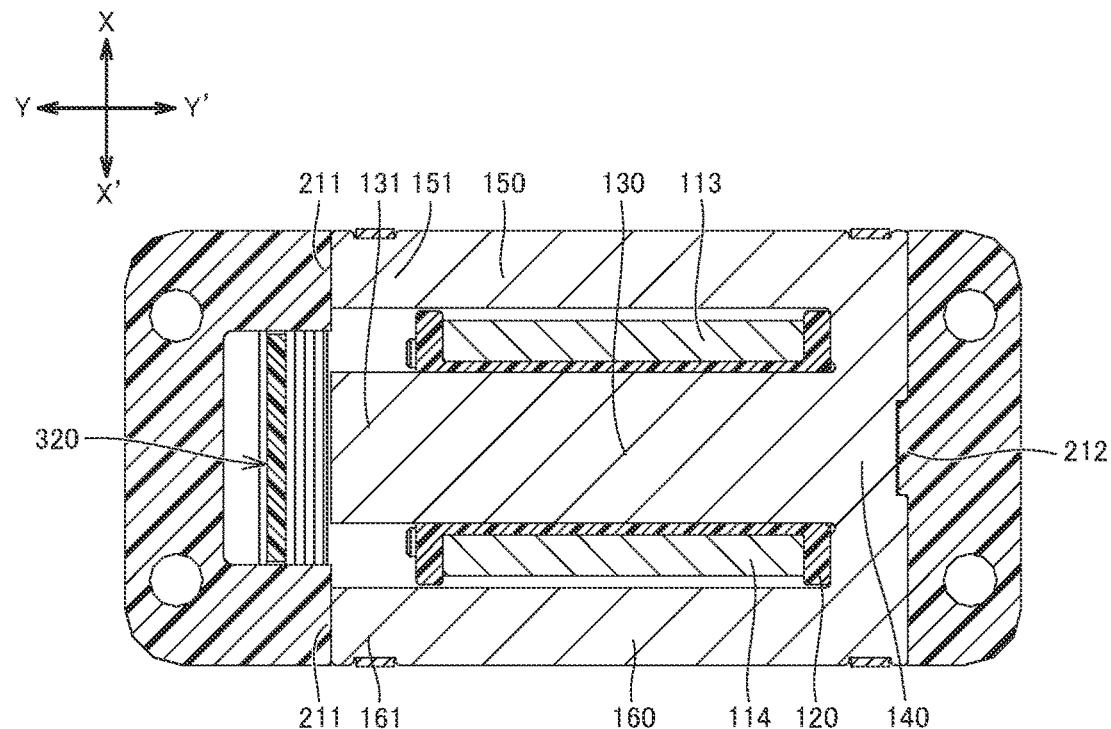
FIG. 2E is a sectional view of the electromagnetic actuator taken along a line 2E-2E in FIG. 2A.
Figure 3A:
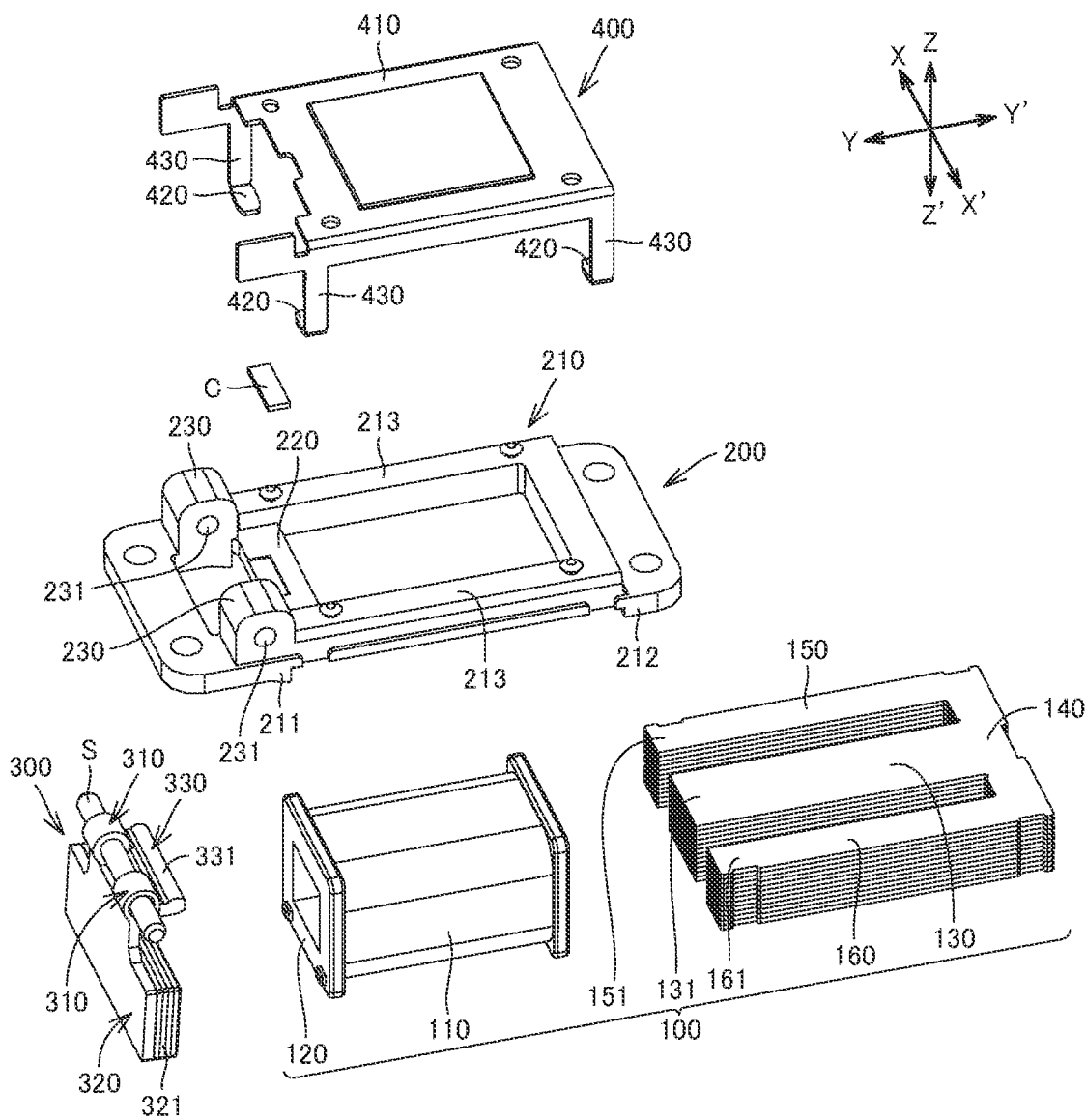
FIG. 3A is an exploded perspective view of the electromagnetic actuator as viewed from the front, the top, and the right side.
Figure 3B:
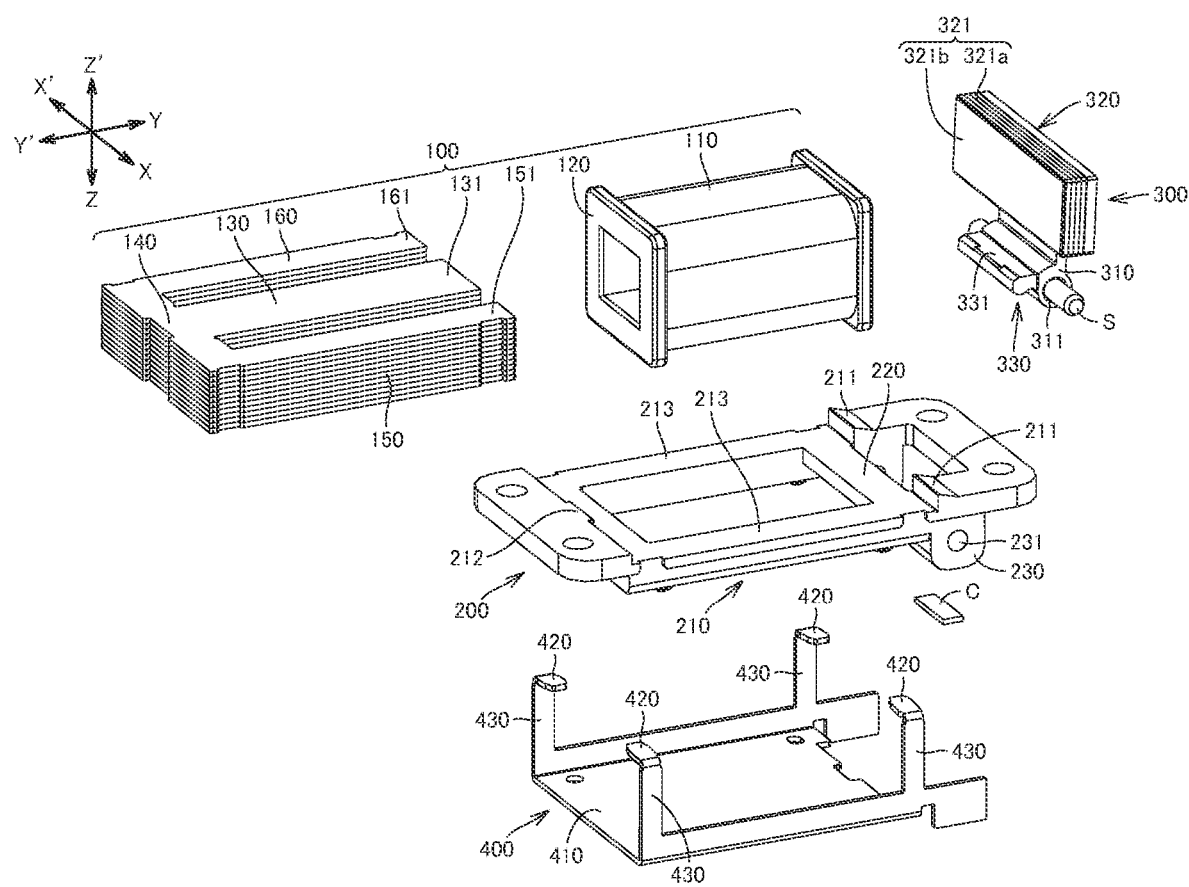
FIG. 3B is an exploded perspective view of the electromagnetic actuator as viewed from the back, the bottom, and the right side.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the electromagnetic actuators and vibration application mechanism and their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

Various aspects of the invention, including first to third embodiments and modifications thereof, will now be described. Elements of the embodiments and the variants to be described may be combined in any possible manner. Materials, shapes, dimensions, numbers, arrangements, etc. of the constituents of the various aspects of the embodiments and the modifications thereof will be discussed below as examples only and may be modified as long as they achieve similar functions.

First Embodiment

Electromagnetic Actuator

Figure 4A:
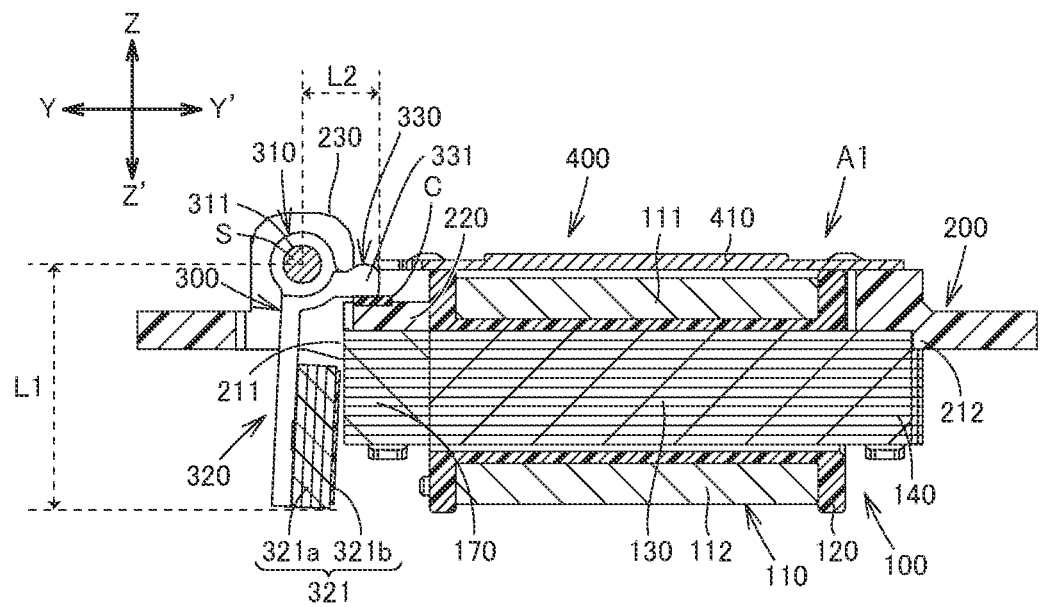
FIG. 4A is a sectional view of an electromagnetic actuator of a design modification, corresponding to FIG. 2A.
Figure 4B:
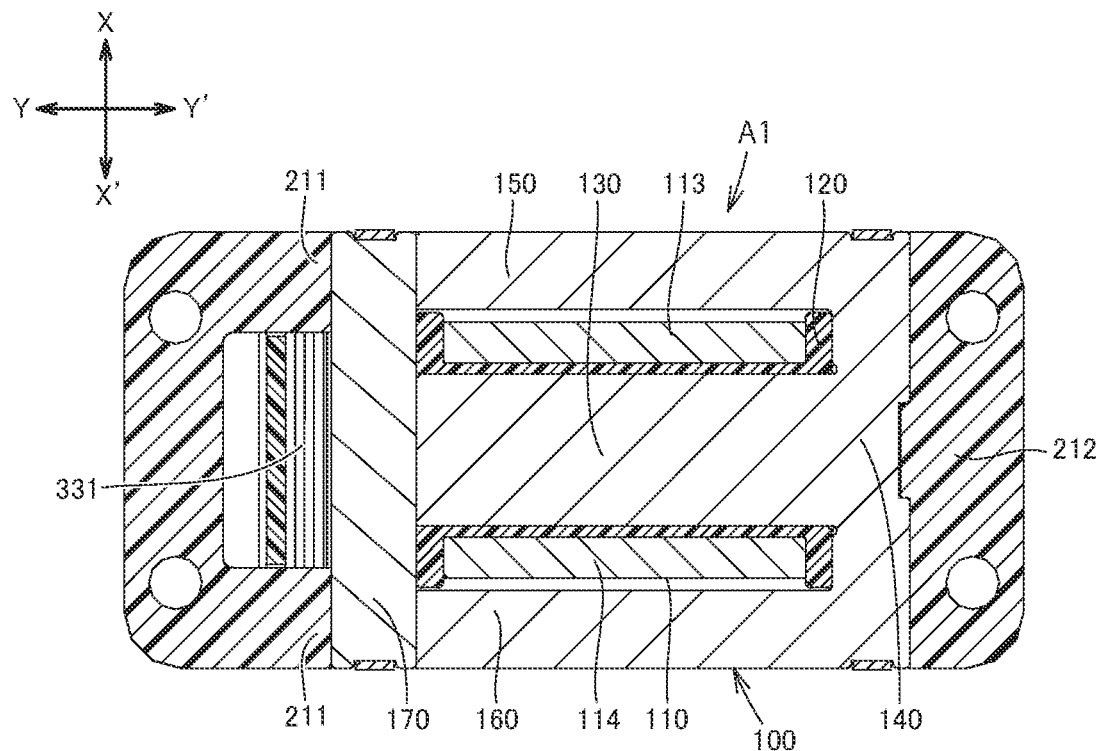
FIG. 4B is a sectional view of the electromagnetic actuator of the design modification, corresponding to FIG. 2E.

Hereinafter described is an electromagnetic actuator A1 (which may be hereinafter referred to simply as an actuator A1) according to a plurality of embodiments, including a first embodiment, of the invention and design modifications thereof, with reference to FIGS. 1A to 4B. FIGS. 1A to 3B show the electromagnetic actuator A1 of the first embodiment, and FIGS. 4A and 4B show a variant of the electromagnetic actuator A1 of the first embodiment.

FIGS. 1A to 2B, 2D to 2E, 3A to 3B, and 4A to 4B show a Y-Y' direction (a first direction). The Y-Y' direction includes a Y direction (the other side in the first direction) and a Y' direction (one side in the first direction). FIGS. 1A to 2C, 3A to 3B, and 4A show a Z-Z' direction (a second direction) substantially orthogonal to the Y-Y' direction. The Z-Z' direction includes a Z direction (one side in the second direction) and a Z' direction (the other side in the second direction). FIGS. 1A to 1C, 2C to 2E, 3A to 3B, and 4B show an X-X' direction (a third direction) substantially orthogonal to the Y-Y' and Z-Z' directions. The X-X' direction includes an X direction (one side in the third direction) and the X' direction (the other side in the third direction).

The actuator A1 includes a magnetic attractor 100. The magnetic attractor 100 may have any configuration to exert magnetic attractive force in the Y' direction. The magnetic attractor 100 may include an electromagnetic coil 110. The electromagnetic coil 110 is a coil of a tubular shape (e.g., a square-section tubular shape or a circular-section tubular shape) extending in the Y-Y' direction. When energized, the electromagnetic coil 110 exerts a magnetic attractive force in the Y' direction. The electromagnetic coil 110 may include a first portion 111 on the Z-direction side, a second portion 112 on the Z'-direction side, a third portion 113 on the X-direction side, and a fourth portion 114 on the X'-direction side. The Y-Y' direction corresponds to the axial direction of the electromagnetic coil 110. The Y' direction corresponds to the direction of the magnetic attraction of the magnetic attractor 100 (magnetic attraction direction).

The magnetic attractor 100 may further include a coil bobbin 120. The coil bobbin 120 is a tube (e.g., a square-section tube or a circular-section tube) made of an electrically insulating resin or the like material. The electromagnetic coil 110 is wound around the outer perimeter of the coil bobbin 120. The coil bobbin 120 can be omitted.

The magnetic attractor 100 may further include at least one of a first yoke 130, a second yoke 140, a third yoke 150, a fourth yoke 160, and a fifth yoke 170. The first to fifth yokes 130 to 170 may be made of a soft magnetic material.

The first yoke 130 extends in the Y-Y' direction. Where the coil bobbin 120 is provided, the first yoke 130 is received in the coil bobbin 120 and the electromagnetic coil 110. Where the coil bobbin 120 is not provided, the first yoke 130 is inserted in the electromagnetic coil 110.

The first yoke 130 may include a protrusion 131. Where the coil bobbin 120 is provided, the first yoke 130 is inserted through the coil bobbin 120 and the electromagnetic coil 110, and the protrusion 131 of the first yoke 130 protrudes from the coil bobbin 120 in the Y direction to be located on the Y-direction side relative to the coil bobbin 120 and the electromagnetic coil 110. Where the coil bobbin 120 is not provided, the first yoke 130 is inserted through the electromagnetic coil 110, and the protrusion 131 of the first yoke 130 protrudes from the electromagnetic coil 110 in the Y direction to be located on the Y-direction side relative to the electromagnetic coil 110. The protrusion 131 can be omitted. The first yoke 130 can also be omitted.

The second yoke 140 is arranged on the Y'-direction side relative to the electromagnetic coil 110. For example, the second yoke 140 may, but is not required to, extend in the X-X' direction and be arranged on the Y'-direction side relative to the third portion 113 and the fourth portion 114 of the electromagnetic coil 110. Where the first yoke 130 is provided, the second yoke 140 may be coupled to the end in the Y' direction of the first yoke 130. The second yoke 140 may be provided integrally with the first yoke 130, or may be provided as a separate member from the first yoke 130. The second yoke 140 can be omitted.

The third yoke 150 extends in the Y-Y' direction and is arranged on the X-direction side relative to the electromagnetic coil 110 (see FIGS. 1A to 3B). The third yoke 150 may include a protrusion 151 located on the Y-direction side relative to the electromagnetic coil 110. Where the second yoke 140 is provided, the end in the Y' direction of the third yoke 150 may be coupled to the end in the X-direction of the second yoke 140. The third yoke 150 may be provided integrally with the second yoke 140, or may be provided as a separate member from the second yoke 140. The protrusion 151 can be omitted. The third yoke 150 can also be omitted.

The fourth yoke 160 extends in the Y-Y' direction and is arranged on the X'-direction side relative to the electromagnetic coil 110 (see FIGS. 1A to 3B). The fourth yoke 160 may include a protrusion 161 located on the Y-direction side relative to the electromagnetic coil 110. Where the second yoke 140 is provided, the end in the Y' direction of the fourth yoke 160 may be coupled to the end in the X' direction of the second yoke 140. The fourth yoke 160 may be provided contiguously with the second yoke 140 or as a separate member from the second yoke 140. The protrusion 161 can be omitted. The fourth yoke 160 can also be omitted.

The fifth yoke 170 is arranged on the Y-direction side relative to the electromagnetic coil 110. For example, where the protrusion 131 of the first yoke 130 is not provided, the fifth yoke 170 may, but is not required to, extend in the X-X' direction to be arranged on the Y-direction side relative to the third portion 113 and the fourth portion 114 of the electromagnetic coil 110 (see FIGS. 4A and 4B). Where the first yoke 130 is provided, the fifth yoke 170 may be coupled to the end in the Y direction of the first yoke 130. The fifth yoke 170 may be provided contiguously with the first yoke 130 or as a separate member from the first yoke 130. Where the third yoke 150 is provided, the fifth yoke 170 may be coupled to the end in the Y direction of the third yoke 150. The fifth yoke 170 may be provided contiguously with the third yoke 150 or as a separate member from the third yoke 150. Where the fourth yoke 160 is provided, the fifth yoke 170 may be coupled to the end in the Y direction of the fourth yoke 160. The fifth yoke 170 may be provided contiguously with the fourth yoke 160 or as a separate member from the fourth yoke 160. The fifth yoke 170 can be omitted.

The actuator A1 further includes a frame 200. The frame 200 includes a frame body 210. The frame body 210 may be, but is not required to be, constituted by a non-magnetic substance (e.g., an electrically insulative resin). The frame body 210 is in abutment with, and fixed to, the magnetic attractor 100 (more particularly, the electromagnetic coil 110, the coil bobbin 120, and/or at least one of the first yoke 130 to the fifth yoke 170, for example) from the Z-direction side. For example, the frame body 210 can be fixed to the magnetic attractor 100 by at least one of the following means (1) to (3).

(1) The actuator A1 further includes a mounting portion 400. The mounting portion 400 is configured to securely sandwich the frame body 210 and the magnetic attractor 100 in the Z-Z' direction. The mounting portion 400 is constituted by a metal plate or an electrically insulative resin. The mounting portion 400 includes at least one first abutment 410, at least one second abutment 420, and at least one coupling portion 430. The at least one first abutment 410 abuts the frame body 210 from the Z-direction side, and the at least one second abutment 420 abuts the magnetic attractor 100 from the Z'-direction side, so that the at least one first abutment 410 and the at least one second abutment 420 securely sandwich the frame body 210 and the magnetic attractor 100 in the Z-Z' direction.

The at least one coupling portion 430 may have one of the following configurations: (i) a single coupling portion 430 or a plurality coupling portions 430 coupling the single first abutment 410 and the single second abutment 420; (ii) a plurality of coupling portions 430 coupling the single first abutment 410 and the plurality of second abutments 420; or (iii) a plurality coupling portions 430 coupling the plurality of first abutments 410 and the single second abutment 420.

In the embodiment shown in FIGS. 1A to 4B, the mounting portion 400 includes a single first abutment 410, four second abutments 420 (which includes two second abutments 420 on the X-direction side and the remaining two second abutments 420 on the X'-direction side), and four coupling portions 430 (which includes the two coupling portions 430 on the X-direction side and the two coupling portions 430 on the X'-direction side). The first abutments 410 abut the frame body 210 from the Z-direction side. The two coupling portions 430 on the X-direction side extend in the Z' direction from the end on the X-direction side of the first abutment 410. The two second abutments 420 on the X-direction side extend in the X' direction from the respective ends on the Z'-direction side of the two coupling portions 430 and abut the third yoke 150 of the magnetic attractor 100. The two coupling portions 430 on the X'-direction side extend in the Z' direction from the end on the X'-direction side of the first abutment 410. The two second abutments 420 on the X'-direction side extend in the X-direction from the respective ends on the Z'-direction side of the two coupling portions 430 and abut the fourth yoke 160 of the magnetic attractor 100.

(2) The frame body 210 is fixed to the magnetic attractor 100 (more particularly, the electromagnetic coil 110, the coil bobbin 120, and/or at least one of the first yoke 130 to the fifth yoke 170, for example) with an adhesive, a pin or pins, a screw or screws, or other means.

(3) The frame body 210 includes at least one first abutment 211, at least one second abutment 212, and at least one coupling portion 213. In the frame body 210 of this aspect, the at least one first abutment 211 and the at least one second abutment 212 may securely sandwich the magnetic attractor 100 (more particularly, the electromagnetic coil 110, the coil bobbin 120, and/or at least one of the first yoke 130 to the fifth yoke 170, for example) in the Y-Y', X-X', or Z-Z' direction.

To securely sandwich the magnetic attractor 100, the at least one first abutment 211 abuts the magnetic attractor 100 from the Y-, X-, or Z-direction side, and the at least one second abutment 212 abuts the magnetic attractor 100 from the Y'-, X'-, or Z'-direction side. The at least one coupling portion 213 may have one of the following configurations:

(i) a single coupling portion 213 or a plurality of coupling portions 213 coupling the single first abutment 211 and the second abutment 212; (ii) a plurality of coupling portions 213 coupling the single first abutment 211 and the plurality of second abutments 212; or (iii) a plurality of coupling portions 213 coupling the plurality of first abutments 211 and the single second abutment 212.

In the embodiment shown in FIGS. 1A to 3B, the frame body 210 includes two first abutments 211, a single second abutment 212, and two coupling portions 213. The two first abutments 211 respectively abut the third yoke 150 and the fourth yoke 160 of the magnetic attractor 100 from the Y-direction side. The single second abutment 212 abuts the second yoke 140 of the magnetic attractor 100 from the Y'-direction side. The two coupling portions 213 respectively couple the two first abutments 211 to the second abutment 212 and respectively abut the third yoke 150 and the fourth yoke 160 from the Z-direction side.

The at least one first abutment 211 and the at least one second abutment 212 may not securely sandwich or hold the magnetic attractor 100, but may simply abut the magnetic attractor 100. Also, the frame body 210 is not limited to the above-described example aspects but may be fixed to any part of the magnetic attractor 100.

The frame 200 may further include a protector 220. More particularly, the frame body 210 may be provided with the protector 220. The protector 220 may, but is not required to, be provided between the two coupling portions 213 of the frame body 210 as shown in FIGS. 1A to 3B. The magnetic attractor 100 and the protector 220 may further have the following configuration (4-1) or (4-2).

(4-1) The magnetic attractor 100 includes the protrusion 131, the protrusion 151, and/or the protrusion 161. In this case, the protector 220 is arranged, in the Y-Y' direction, between at least one support 230 (to be described) and the first portion 111 of the electromagnetic coil 110, and on the Z-direction side relative to the protrusion 131, the protrusion 151 and/or the protrusion 161 (see FIGS. 1A and 2B).

(4-2) The magnetic attractor 100 includes the fifth yoke 170. The protector 220 is arranged, in the Y-Y' direction, between the at least one support 230 and the first portion 111 of the electromagnetic coil 110, and on the Z-direction side relative to the fifth yoke 170 (see FIG. 4A).

The frame 200 further includes the at least one support 230. The at least one support 230 is provided in the frame body 210 or the protector 220, and is arranged on an oblique-direction side relative to the magnetic attractor 100 (more particularly, the electromagnetic coil 110, the coil bobbin 120, and/or at least one of the first yoke 130 to the fifth yoke 170, for example). The oblique direction includes components of the Y and Z directions. In the embodiment shown in FIGS. 1A to 3B, two supports 230 are provided respectively on top of the two first abutments 211 of the frame body 210 to be located on the oblique-direction side respectively relative to the third yoke 150 and the fourth yoke 160. In the variant shown in FIGS. 4A to 4B, two supports 230 are provided respectively on top of the two first abutments 211 of the frame body 210 to be located on the oblique-direction side relative to the fifth yoke 170. It should be noted that the protector 220 can be omitted.

The actuator A1 further includes a lever 300. The lever 300 may be, for example, generally L- or V-shaped, and constituted by a non-magnetic substance. The lever 300 includes at least one fulcrum portion 310. The or each fulcrum portion 310 is opposed in the X-X' direction to, and pivotally supported by, the or a corresponding support 230. For example, the or each fulcrum portion 310 is pivotally supported by the or a corresponding support 230 in any one of the following manners (A) to (D).

(A) The or each fulcrum portion 310 includes a through hole 311 and a shaft S, and the or each support 230 includes a support hole 231. The or each through hole 311 extend through the or a corresponding fulcrum portion 310 in the X-X' direction. The or each support hole 231 may be a through hole extending through the or a corresponding support 230 in the X-X' direction, or alternatively may be a blind hole extending in the or a corresponding support 230 in the X-X' direction and opening toward the neighboring fulcrum portion 310. The or each shaft S has an outer diameter that is substantially as large as, or slightly larger than, the diameter of the or a corresponding through hole 311 and slightly smaller than the diameter of the or a corresponding support hole 231. The or each shaft S is fittingly received in the or a corresponding through hole 311 but rotatably supported by the or a corresponding support hole 231. When the or each shaft S rotates in the support hole 231 of the or a corresponding support 230, this causes the lever 300 to pivot about the at least one fulcrum portion 310. In this case, the central axis of the at least one fulcrum portion 310 is the central axis of the at least one shaft S extending in the X-X' direction. Where a plurality of fulcrum portions 310 is provided, the shafts S of the fulcrum portions 310 may be connected together to form a single shaft.

(B) The or each fulcrum portion 310 includes a through hole 311, and the or each support 230 includes a support hole 231 and a shaft S. The or each through hole 311 and the or each support hole 231 are configured as described for (A) above, except for the following points. The or each shaft S has an outer diameter that is slightly smaller than the diameter of the or a corresponding through hole 311 and substantially as large as, or slightly larger than, the diameter of the or a corresponding support hole 231. The or each shaft S is rotatably received in the or a corresponding through hole 311 but fittingly received in the or a corresponding support hole 231. When the at least one fulcrum portion 310 rotates about the at least one shaft S, this causes the lever 300 to pivot about the at least one fulcrum portion 310. In this case, the central axis of the at least one fulcrum portion 310 is the central axis of the at least one through hole 311 extending in the X-X' direction. Where a plurality of supports 230 is provided, the shafts S of the supports 230 may be connected together to form a single shaft.

In the embodiment shown in FIGS. 1A to 4B, a pair of fulcrum portions 310 and a pair of supports 230 are provided. The supports 230 are located outside the fulcrum portions 310 in the X-X' direction. The fulcrum portions 310 are pivotally supported by the respective supports 230 as described in a manner (A) or (B) above. The shafts S of the fulcrum portions 310 or the supports 230 connected together to form a single shaft.

(C) The or each fulcrum portion 310 includes a shaft, and the or each support 230 includes a support hole. The or each support hole may be a through hole extending through the or a corresponding support 230 in the X-X' direction, or alternatively may be a blind hole extending in the or a corresponding support 230 in the X-X' direction and opening toward the neighboring fulcrum portion 310. The or each shaft extends in the X-X' direction from the or a corresponding fulcrum portion 310 toward the neighboring support 230. The or each shaft has an outer diameter that is slightly smaller than the diameter of the or a corresponding support hole. The or each shaft is rotatably supported by the or a corresponding support hole. When the or shaft rotates in the support hole of the or a corresponding support 230, this causes the lever 300 to pivot about the at least one fulcrum portion 310. In this case, the central axis of the at least one fulcrum portion 310 is the central axis of the at least one shaft extending in the X-X' direction.

(D) The or each fulcrum portion 310 includes a support hole, and the or each support 230 includes a shaft. The or each support hole may be a through hole extending through the or a corresponding fulcrum portion 310 in the X-X' direction, or alternatively may be a blind hole extending in a corresponding fulcrum portion 310 in the X-X' direction and opening toward the neighboring support 230. The or each shaft extends in the X-X' direction from the or a corresponding support 230 toward the neighboring fulcrum portion 310. The or each shaft has an outer diameter that is slightly smaller than the diameter of the or a corresponding support hole. The or each shaft is rotatably received in the or a corresponding support hole. When the or each fulcrum portion 310 rotates about the shaft of the or a corresponding support 230, this causes the lever 300 to pivot about the at least one fulcrum portion 310. In this case, the central axis of the at least one fulcrum portion 310 is the central axis of the at least one support hole extending in the X-X' direction.

The lever 300 further includes a first arm 320. The first arm 320 extends in the Z' direction from the at least one fulcrum portion 310. The first arm 320 includes a first displaceable portion 321. The first displaceable portion 321 is constituted at least partly by a magnetic substance and is located on the Z'-direction side relative to the at least one fulcrum portion 310. In the embodiment shown in FIGS. 1A to 4B, the first displaceable portion 321 includes a magnetic body 321a and a buffer 321b. The buffer 321b is adhered to the face on the Y'-direction side of the magnetic body 321a. The buffer 321b may be constituted by a non-magnetic substance, which may be made of elastic material (e.g., rubber), synthetic resin, or other material. Needless to say, the first displaceable portion 321 may be constituted entirely by a magnetic substance.

The first displaceable portion 321 is arranged on the Y-direction side relative to the magnetic attractor 100, with a gap therebetween. For example, where the magnetic attractor 100 includes the protrusion 131, the protrusion 151 and/or the protrusion 161, the first displaceable portion 321 may be arranged on the Y-direction side relative to the protrusion 131, the protrusion 151 and/or the protrusion 161, with a gap or gaps therebetween (see FIGS. 2A, 2B, and 2E). Where the magnetic attractor 100 includes the fifth yoke 170, the first displaceable portion 321 may be arranged on the Y-direction side relative to the fifth yoke 170, with a gap therebetween (see FIGS. 4A and 4B). Where the magnetic attractor 100 includes none of the protrusion 131, the protrusion 151, and the protrusion 161 of the magnetic attractor 100, or where the magnetic attractor 100 does not include the fifth yoke 170, the first displaceable portion 321 may be arranged on the Y-direction side relative to the electromagnetic coil 110, with a gap therebetween.

When the magnetic attractor 100 exerts a magnetic attractive force in the Y' direction to magnetically attract the first displaceable portion 321, this causes the first displaceable portion 321 to be displaced in the Y' direction, and causes the lever 300 to pivot in a direction in accordance with the principle of levers. This pivotal movement of the lever 300 may be hereinafter referred to as the "first pivotal movement." When the magnetic attractor 100 has ceased to exert a magnetic attractive force, the lever 300 may pivot in the opposite direction. This pivotal movement of the lever 300 may be hereinafter referred to as the "second pivotal movement." The second pivotal movement causes the first displaceable portion 321 to be displaced in the Y direction.

The lever 300 further includes a second arm 330. The second arm 330 extends in the Y' direction from the at least one fulcrum portion 310. The second arm 330 may be constituted by a non-magnetic substance. The second arm 330 includes a second displaceable portion 331 located on the Y'-direction side relative to the at least one fulcrum portion 310. The second displaceable portion 331 is arranged on the Z-direction side relative to the magnetic attractor 100. For example, where the magnetic attractor 100 includes the protrusion 131, the protrusion 151 and/or the protrusion 161, the second displaceable portion 331 may be arranged on the Z-direction side relative to the protrusion 131, the protrusion 151 and/or the protrusion 161, and on the Y-direction side relative to the first portion 111 of the electromagnetic coil 110. Where the magnetic attractor 100 includes the fifth yoke 170, the second displaceable portion 331 may be arranged on the Z-direction side relative to the fifth yoke 170, and on the Y-direction side relative to the first portion 111 of the electromagnetic coil 110.

Where the protector 220 is provided, the second displaceable portion 331 may be arranged on the Z-direction side relative to the magnetic attractor 100 and the protector 220. In other words, the protector 220 may be arranged between the second displaceable portion 331 and the magnetic attractor 100. For example, the protector 220 may be arranged between the second displaceable portion 331 and at least one of the protrusion 131, the protrusion 151, or the protrusion 161, or alternatively between the second displaceable portion 331 and the fifth yoke 170. At least one of the protector 220 or the second displaceable portion 331 may include a buffer C. If the protector 220 includes the buffer C, the buffer C may be made of an elastic material, such as rubber, and provided on the face of the protector 220 that faces the second displaceable portion 331 (i.e., on the face on the Z-direction side of the protector 220). If the second displaceable portion 331 includes the buffer C, the buffer C may be made of an elastic material, such as rubber, and provided on the face of the second displaceable portion 331 that faces the protector 220 (i.e., on the face on the Z'-direction side of the second displaceable portion 331). In either case, the buffer C serves to lessen an impact generated when the second displaceable portion 331 comes into abutment with the protector 220. The buffer C can be omitted.

When the first displaceable portion 321 is magnetically attracted by the magnetic attractor 100 and displaced in the Y' direction and the lever 300 accordingly makes the first pivotal movement about the at least one fulcrum portion 310, this causes the second displaceable portion 331 to be displaced in the Z direction, away from the magnetic attractor 100 (for example, the protrusion 131, the protrusion 151, and/or the protrusion 161, or the fifth yoke 170), or away from both the magnetic attractor 100 and the frame 200 (i.e., the protector 220). When the lever 300 makes the second pivotal movement about the at least one fulcrum portion 310, this causes the second displaceable portion 331 to be displaced in the Z' direction, toward the magnetic attractor 100, or toward both the magnetic attractor 100 and the frame 200.

A distance from the central axis of the at least one fulcrum portion 310 to the end on the Z'-direction side of the first displaceable portion 321 is defined as a first distance L1. A distance from the central axis of the at least one fulcrum portion 310 to the end on the Y'-direction side of the second displaceable portion 331 is defined as a second distance L2. The first distance L1 may be larger than the second distance L2. In other words, the second distance L2 may be smaller than the first distance L1. Alternatively, the first distance L1 may be as large as, the second distance L2. Still alternatively, the first distance L1 may be smaller than the second distance L2.

The actuator A1 configured as described above provides the following technical features and effects.

First Technical Features and Effects

The actuator A1 is downsized for the following reasons. The first displaceable portion 321 of the first arm 320 is arranged on the Y-direction side relative to the magnetic attractor 100, and the second displaceable portion 331 of the second arm 330 is arranged on the Z-direction side relative to the magnetic attractor 100, or relative to both the magnetic attractor 100 and the frame 200. In other words, the second displaceable portion 331 of the second arm 330 is so arranged as to overlap the magnetic attractor 100 in the Z-Z' direction, or overlap the magnetic attractor 100 and the frame 200 in the Z-Z' direction, resulting in the reduced dimension in the Y-Y' direction of the actuator A1. Moreover, where the first yoke 130 includes the protrusion 131, the third yoke 150 includes the protrusion 151, and/or the fourth yoke 160 includes the protrusion 161, the second displaceable portion 331 is arranged in an otherwise unused space on the Z-direction side relative to the protrusion 131, the protrusion 151, and/or the protrusion 161 and on the Y-direction side relative to the electromagnetic coil 110, resulting in the reduced dimension in the Z-Z' direction of the actuator A1. Where the fifth yoke 170 is provided, the second displaceable portion 331 is arranged in an otherwise unused space on the Z-direction side relative to the fifth yoke 170 and on the Y-direction side relative to the electromagnetic coil 110, resulting in the reduced dimension in the Z-Z' direction of the actuator A1.

Second Technical Features and Effects

Where the protector 220 is provided, the protector 220 is arranged between the second displaceable portion 331 and the magnetic attractor 100. This arrangement prevents the second displaceable portion 331 colliding with the magnetic attractor 100 when the second displaceable portion 331 is displaced in the Z' direction.

Third Technical Features and Effects

Where the second distance L2 is smaller than the first distance L1, in accordance with the principle of levers, increased is the amount of displacement in the Y-Y' direction of the first displaceable portion 321, while reduced is the amount of displacement in the Z-Z' direction of the second displaceable portion 331. The increased amount of displacement in the Y-Y' direction of the first displaceable portion 321 results in increase in magnetic attractive force of the magnetic attractor 100 relative to the first displaceable portion 321. The relatively smaller second distance L2 results in a larger force by the second displaceable portion 331 applied to a target.

Vibration Application Mechanism M

Figure 5:
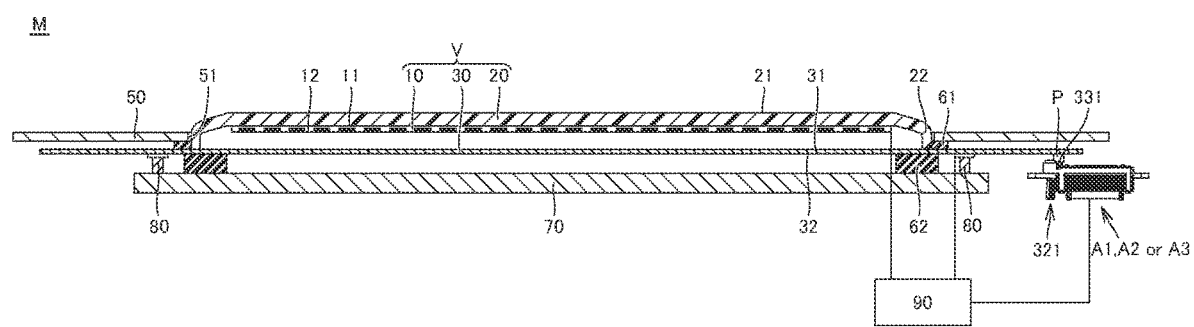
FIG. 5 is a schematic sectional view of a vibration application mechanism according to the first embodiment of the invention.
Figure 6:
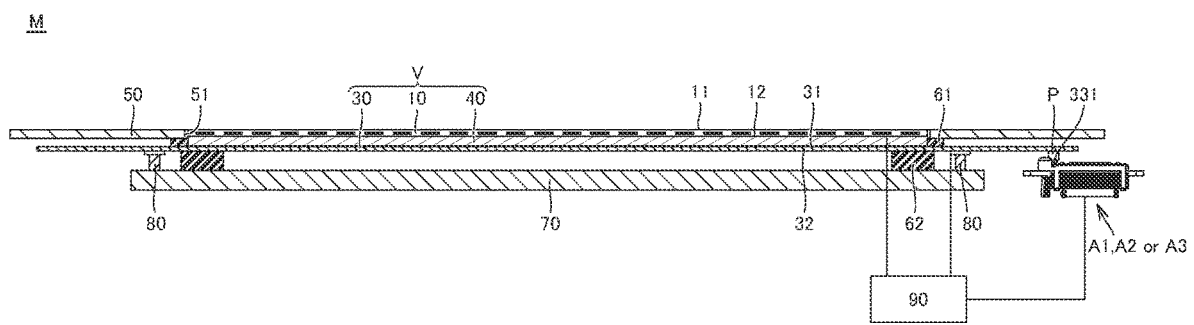
FIG. 6 is a schematic sectional view of a first design modification of the vibration application mechanism of the first embodiment.
Figure 7:
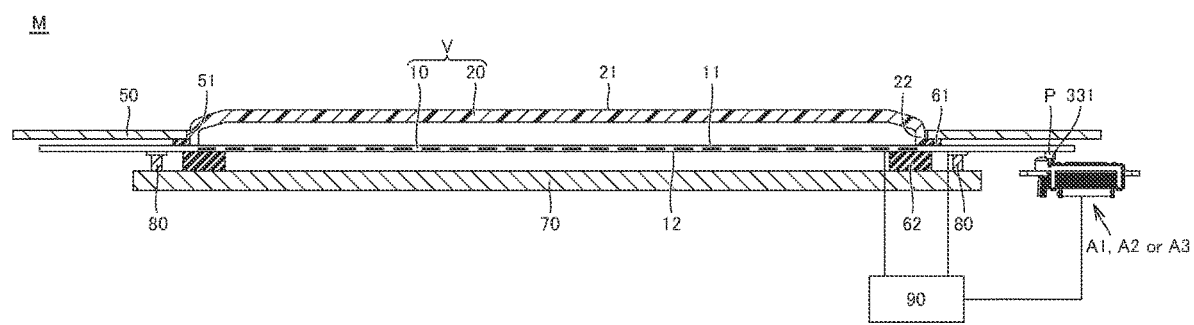
FIG. 7 is a schematic sectional view of a second design modification of the vibration application mechanism of the first embodiment.

Hereinafter described is a vibration application mechanism M according to a plurality of embodiments, including a first embodiment, of the invention and design modifications thereof, with reference to FIGS. 5 to 7. FIG. 5 shows the vibration application mechanism M of the first embodiment. FIG. 6 shows a first variant of the vibration application mechanism M of the first embodiment. FIG. 7 shows a second variant of the vibration application mechanism M of the first embodiment.

The vibration application mechanism M includes the actuator A1 according to any of the above aspects, and a vibratable part V. The vibratable part V includes a touch sensor 10 (see FIGS. 5 to 7). The touch sensor 10 is a capacitive touch panel or a capacitive touch switch. The touch sensor 10 has a first face 11 on the one side in the thickness direction of the touch sensor 10 and a second face 12 on the opposite side from the first face 11 (on the other side in the thickness direction).

The vibratable part V may further include an operation panel 20. The operation panel 20 includes a panel body 21. The panel body 21 is a plate including a first face on the one side in the thickness direction of the panel body 21 and a second face on the opposite side from the first face. The operation panel 20 may further include a leg 22. The leg 22 may be a tube extending from the peripheral edge of the panel body 21 in the thickness direction of the panel body 21.

The vibratable part V may further include a vibratable plate 30. The vibratable plate 30 is a metal plate or the like and has a first face 31 on the one side in the thickness direction of the vibratable plate 30 and a second face 32 on the opposite side from the first face 31.

The vibratable part V may further have any one of the following configurations (A) to (D).

(A) Where the vibratable plate 30 and the operation panel 20 are provided, the following configuration (A1) or (A2) may be adopted. (A1): The leg 22 of the operation panel 20 is fixed to the first face 31 of the vibratable plate 30, and the first face 11 of the touch sensor 10 is fixed to the second face of the panel body 21 of the operation panel 20 (see FIG. 5). (A2) The second face 12 of the touch sensor 10 is fixed to the first face 31 of the vibratable plate 30, and the second face of the panel body 21 of the operation panel 20 is fixed to the first face 11 of the touch sensor 10. In configuration (A2), the leg 22 of the operation panel 20 is omitted. Configuration (A1) and (A2) may be modified such that one or a plurality of intermediate members 40 is interposed between the touch sensor 10 and the panel body 21 and/or between the touch sensor 10 and the vibratable plate 30.

(B) Where the vibratable plate 30 is provided but the operation panel 20 is not provided, the second face 12 of the touch sensor 10 is fixed to the first face 31 of the vibratable plate 30. Configuration (B) may be modified such that one or a plurality of intermediate members 40 is interposed between the touch sensor 10 and the vibratable plate 30 (see FIG. 6).

(C) Where the operation panel 20 is provided but the vibratable plate 30 is not provided, the following configuration (C1) or (C2) may be adopted. (C1) the leg 22 of the operation panel 20 is fixed to the first face 11 of the touch sensor 10 (see FIG. 7). (C2) The second face of the panel body 21 of the operation panel 20 is partly or entirely fixed to the first face 11 of the touch sensor 10. In configuration (C2), the leg 22 of the operation panel 20 is omitted. Configuration (C1) and (C2) may be modified such that one or a plurality of intermediate members 40 is interposed between the touch sensor 10 and the panel body 21.

(D) Where neither the vibratable plate 30 nor the operation panel 20 is provided, the vibratable part V may be constituted by the touch sensor 10 only.

Where the vibratable part V has configuration (A) or (C), the touch sensor 10 detects a touching action, or a coordinate position of the touching action, by a detection target (e.g., a finger of a user or a stylus) on the first face (which may be referred to as the touch surface) of the panel body 21. Where the vibratable part V has configuration (B) or (D), the touch sensor 10 detects a touching action, or a coordinate position of the touching action, on the first face 11 (which may be referred to as the touch surface) of the touch sensor 10.

The vibration application mechanism M may further include a housing 50. The housing 50 has an opening 51. Where the vibratable part V has configuration (A), the peripheral edge of the vibratable plate 30 may be fixed, directly or indirectly via a cushion material 61, to the edge of the opening 51 of the housing 50, and the operation panel 20 may be exposed through the opening 51. Where the vibratable part V has configuration (B), the peripheral edge of the vibratable plate 30 may be fixed, directly or indirectly via a cushion material 61, to the edge of the opening 51 of the housing 50, and the touch sensor 10 may be exposed through the opening 51. Where the vibratable part V has configuration (C), the peripheral edge of the touch sensor 10 may be fixed, directly or indirectly via a cushion material 61, to the edge of the opening 51 of the housing 50, and the operation panel 20 may be exposed through the opening 51. Where the vibratable part V has configuration (D), the peripheral edge of the touch sensor 10 may be fixed, directly or indirectly via a cushion material 61, to the edge of the opening 51 of the housing 50, and the central portion of the touch sensor 10 may be exposed through the opening 51. The housing 50 can be omitted. Where omitted, the housing 50 may be substituted by a housing of an electronic device to mount the vibration application mechanism M. The cushion material 61 can be replaced with a rigid member of synthetic resin or other material.

The vibration application mechanism M may further include a fixing portion 70. The fixing portion 70 faces the vibratable part V. Where the vibratable part V has configuration (A) or (B), the vibratable plate 30 may be fixed to the fixing portion 70, directly or indirectly via a cushion material 62. Where the vibratable part V has configuration (C) or (D), the touch sensor 10 may be fixed to the fixing portion 70, directly or indirectly via a cushion material 62. The fixing portion 70 may have any configuration that allows the vibratable plate 30 or the touch sensor 10 to be fixed to the fixing portion 70 in a manner described above. The fixing portion 70 can be omitted. Where omitted, the fixing portion 70 may be substituted by a component of the above-described electronic device. The cushion material 62 can be replaced with a rigid member of synthetic resin or other material.

The actuator A1 may be arranged on one or the other side relative to the vibratable part V. For example, where the vibratable part V has configuration (A) or (B), the actuator A1 is arranged on one or the other side in the thickness direction relative to the vibratable plate 30. In this case, the second displaceable portion 331 of the actuator A1 may abut the first face 31 or the second face 32 of the vibratable plate 30. Where the vibratable part V has configuration (C) or (D), the actuator A1 may be arranged on one or the other side in the thickness direction relative to the touch sensor 10. In this case, the second displaceable portion 331 of the actuator A1 may abut the first face 11 or the second face 12 of the touch sensor 10.

The vibration application mechanism M may further include a pressor P. The pressor P is constituted by an elastic body of rubber or other material, or constituted by a rigid body of a metal, a synthetic resin, or other material. The pressor P is interposed between the vibratable part V and the second displaceable portion 331 of the actuator A1. For example, where the vibratable part V has configuration (A) or (B), the pressor P is interposed between the vibratable plate 30 of the vibratable part V and the second displaceable portion 331 of the actuator A1. In this case, the pressor P may be fixed to at least one of the vibratable plate 30 and the second displaceable portion 331, or may be simply held by and between the vibratable plate 30 and the second displaceable portion 331. Where the vibratable part V has configuration (C) or (D), the pressor P may be interposed between the touch sensor 10 of the vibratable part V and the second displaceable portion 331 of the actuator A1. In this case, the pressor P may be fixed to at least one of the touch sensor 10 or the second displaceable portion 331, or may be simply held by and between the touch sensor 10 and the second displaceable portion 331.

In the actuator A1, when the electromagnetic coil 110 of the magnetic attractor 100 is intermittently energized to make the magnetic attractor 100 magnetically attract the first displaceable portion 321 intermittently in the Y' direction, this causes the first displaceable portion 321 to be intermittently displaced in the Y' direction, the lever 300 intermittently to make the first pivotal movement, and the second displaceable portion 331 to be intermittently displaced in the Z direction. As a result, the second displaceable portion 331 intermittently presses the vibratable part V from the Z'-direction side, directly or indirectly via the pressor P. This intermittent pressing causes the vibratable part V to vibrate.

Where the vibratable part V has configuration (A) or (B), the second displaceable portion 331 of the actuator A1 may be configured to intermittently press the vibratable plate 30 of the vibratable part V directly or indirectly via the pressor P. This intermittent pressing causes the vibratable plate 30 to bend to the one or other side in the thickness direction, in reaction to which the vibratable plate 30 bends to the other side or the one side in the thickness direction. The vibratable plate 30 thus vibrates, and the entire vibratable part V accordingly vibrates. Where the vibratable part V has configuration (C) or (D), the second displaceable portion 331 of the actuator A1 may be configured to intermittently press the touch sensor 10 of the vibratable part V from the Z'-direction side, directly or indirectly via the pressor P. This intermittent pressing causes the touch sensor 10 to bend to the one or other side in the thickness direction, in reaction to which the touch sensor 10 to bend to the other side or the one side in the thickness direction. The touch sensor 10 thus vibrates, and the entire vibratable part V accordingly vibrates.

Where the pressor P is an elastic body, the displacement of the second displaceable portion 331 causes the pressor P to be sandwiched between, and compressed by, the second displaceable portion 331 and the vibratable part V (e.g., the vibratable plate 30 or the touch sensor 10).

In this embodiment, the second distance L2 may be smaller than the first distance L1. Particularly, the second distance L2 may be set such that the amount of displacement of the second displaceable portion 331 is 0.3 mm or less. The amount of displacement of the second displaceable portion 331 is a distance in the Z-Z' direction from an initial position to a displaced position of the tip end on the Y'-direction side of the end face on the Z'-direction side of the second displaceable portion 331. The initial position is the position at which the second displaceable portion 331 is located before the displacement, and the displaced position is the position at which the second displaceable portion 331 is displaced in the Z direction to the maximum extent. The amount of displacement of the second displaceable portion 331 is not limited to 0.3 mm or less, but may exceed 0.3 mm.

The actuator A1 may be configured such that when the electromagnetic coil 110 of the magnetic attractor 100 becomes de-energized and the magnetic attractor 100 has ceased to exert the magnetic attraction, this causes the second pivotal movement of the lever 300 in at least one of the following manners (E) and (F).

(E) When the magnetic attractor 100 has ceased to exert the magnetic attraction, the vibratable part V (e.g., the vibratable plate 30 or the touch sensor 10) bends to the other side or the one side in the thickness direction, which causes the vibratable part V to press the second displaceable portion 331 from the Z-direction side, directly or indirectly via the pressor P. As a result, the second displaceable portion 331 moves back in the Z' direction, the lever 300 makes the second pivotal movement about the fulcrum portion 310, and the first displaceable portion 321 moves back in the Y' direction.

(F) Where the pressor P is an elastic body, when the magnetic attractor 100 has ceased to exert the magnetic attraction, the pressor P restores itself and presses the second displaceable portion 331 from the Z-direction side. As a result, the second displaceable portion 331 moves back in the Z' direction, the lever 300 makes the second pivotal movement about the fulcrum portion 310, and the first displaceable portion 321 moves back in the Y' direction.

The vibration application mechanism M may further include at least one load detector 80. The at least one load detector 80 is configured to change a signal (such as voltage) in accordance with a load applied to the vibratable plate 30 or the touch sensor 10 of the vibratable part V.

The vibration application mechanism M may further include a controller 90. The controller 90 is constituted by a logic circuit (e.g. an integrated circuit (IC)) or software to processed by a processor or the like. The controller 90 includes a touch controller and a vibration controller. The controller 90 is electrically connected to the touch sensor 10, the actuator A1, and the at least one load detector 80. Each of the touch controller and the vibration controller of the controller 90 may be independently constituted by a logic circuit (e.g. an integrated circuit (IC)) or software to processed by a processor or the like.

The touch controller monitors signals from or in the touch sensor 10. The touch controller is configured to detect the above-described touching action, or a coordinate position of the touching action, by a detection target when the touch controller determines that a signal from or in the touch sensor 10 exceeds a threshold value stored in a memory of the touch controller.

The vibration controller monitors signals from the at least one load detector 80. The vibration controller may be configured to energize the electromagnetic coil 110 of the actuator A1 intermittently for a predetermined period and when the touch controller determines that a signal from the at least one load detector 80 exceeds a threshold value stored in a memory of the vibration controller.

The at least one load detector 80 can be omitted. Where the at least one load detector 80 is omitted, the vibration controller may be configured to energize the electromagnetic coil 110 of the actuator A1 intermittently for a predetermined period when the touch controller detects the above-described touching action, or a coordinate position of the touching action.

The controller 90 can be omitted. Where omitted, the controller 90 may be substituted by a controller of the above-described electronic device.

In the vibration application mechanism M configured as described above, the second distance L2 is smaller than the first distance L1 in the actuator A1. This arrangement makes it possible, in accordance with the principle of levers, to increase the amount of displacement in the Y-Y' direction of the first displaceable portion 321, and to reduce the amount in the Z-Z' direction of displacement of the second displaceable portion 331. The relatively smaller second distance L2 results in a larger magnetic attractive force by the magnetic attractor 100 applied to the first displaceable portion 321 and a larger pressing force by the second displaceable portion 331.

As the vibratable part V includes the touch sensor 10, an image may be projected on the touch surface of the vibratable part V by a display device not shown, or an image may be printed on the touch surface. If the amount of displacement of the second displaceable portion 331 exceeds 0.3 mm, the image on the touch surface is more likely to be blurred, but if the amount of displacement of the second displaceable portion 331 is 0.3 mm or less, the image on the touch surface is less blurry. It should be appreciated that the blurring of the image on the touch surface can be reduced also by the cushion material 61 and/or the cushion material 62, the amount of displacement of the second displaceable portion 331 is not limited to 0.3 mm or less in the vibration application mechanism M.

Second Embodiment

Figure 8:
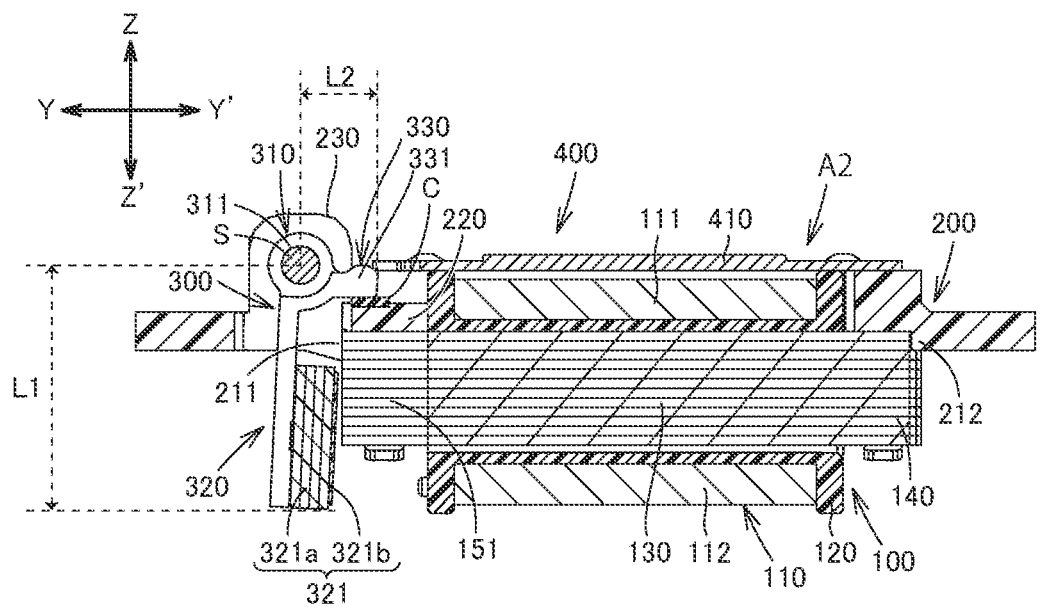
FIG. 8 is a sectional view of an electromagnetic actuator according to a second embodiment of the invention, corresponding to FIG. 2A.

Hereinafter described is an electromagnetic actuator A2 (which may be hereinafter referred to simply as an actuator A2) according to a plurality of embodiments, including a second embodiment, of the invention and design modifications thereof, with reference to FIG. 8. FIG. 8 shows the actuator A2 of the second embodiment. The actuator A2 has a similar configuration to that of the actuator A1, with the following differences (i) and (ii) from the actuator A1. (i) A protector 220 of a frame 200 is arranged between at least one support 230 and an electromagnetic coil 110 in the Y-Y' direction, and none of a first yoke 130 to a fifth yoke 170 of a magnetic attractor 100 is provided on the Z'-direction side relative to the protector 220. (ii) A second displaceable portion 331 of a lever 300 is arranged on the Z-direction side relative to the frame 200, not relative to the magnetic attractor 100. The actuator A2 will now be described focusing on the differences from the actuator A1 and omitting overlapping descriptions.

As mentioned above, the first to fifth yokes 130 to 170 of the magnetic attractor 100 are not provided on the Z'-direction side relative to the protector 220. Specifically, it is possible to omit all of the first to fifth yokes 130 to 170, or alternatively omit the first yoke 130, the third yoke 150, and/or the fourth yoke 160, or alternatively omit the protrusion 131 of the first yoke 130, the protrusion 151 of the third yoke 150, and/or the protrusion 161 of the fourth yoke 160, or alternatively omit the fifth yoke 170 only. The protector 220 is arranged on the Z-direction side relative to a space created by omitting the yoke(s) entirely or partly. Alternatively, the protector 220 may be arranged on the Z-direction side relative to a space neighboring the protrusion 131, the protrusion 151, or the protrusion 161 in the X-X' direction, and none of the yokes or no part of any yoke exists in this space. In the embodiment shown in FIG. 8, omitted is the protrusion 131 only, and the protector 220 is arranged on the Z-direction side relative to a space between the third yoke 150 and the fourth yoke 160 in the X-X' direction.

The second displaceable portion 331 of the lever 300 is arranged on the Z-direction side relative to the protector 220 of the frame 200 and on the Y-direction side relative to a first portion 111 of the electromagnetic coil 110 of the magnetic attractor 100. When a first displaceable portion 321 is magnetically attracted by the magnetic attractor 100 and displaced in the Y' direction and the lever 300 accordingly makes the first pivotal movement, this causes the second displaceable portion 331 to be displaced in the Z direction, away from the protector 220. When the lever 300 makes the second pivotal movement, this causes the second displaceable portion 331 to be displaced in the Z' direction, toward the protector 220.

The actuator A2 is downsized for the following reasons. The second displaceable portion 331 is arranged on the Z-direction side relative to the protector 220 of the frame 200 and on the Y-direction side relative to the first portion 111 of the electromagnetic coil 110 of the magnetic attractor 100. In other words, the second displaceable portion 331 is so arranged as to overlap the protector 220 in the Z-Z' direction, resulting in the reduced dimension in the Y-Y' direction of the actuator A2. Further, the actuator A2 provides the same effects as the second and third technical features and effects of the actuator A1.

The vibration application mechanism M may be configured as described above, except that the actuator A1 is replaced by the actuator A2 of any of the above aspects. This vibration application mechanism M also provides the same technical features and effects as described above.

Third Embodiment

Figure 9:
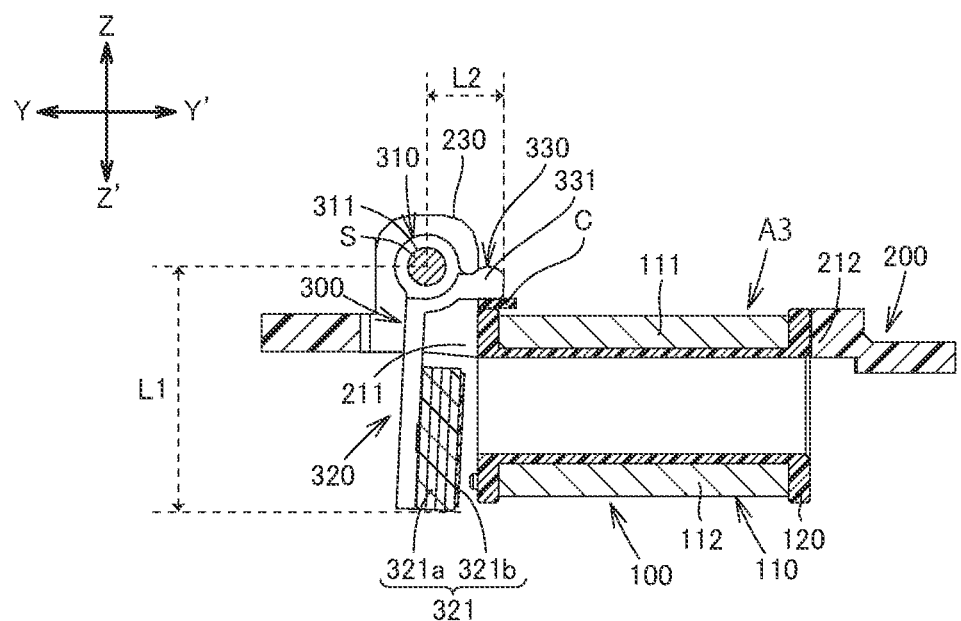
FIG. 9 is a sectional view of an electromagnetic actuator according to a third embodiment of the invention, corresponding to FIG. 2A.

Hereinafter described is an electromagnetic actuator A3 (which may be hereinafter referred to simply as an actuator A3) according to a plurality of embodiments, including a third embodiment, of the invention and design modifications thereof, with reference to FIG. 9. FIG. 9 shows the actuator A3 of the third embodiment. The actuator A3 has a similar configuration to that of the actuator A1, with a difference from the actuator A1 being that a second displaceable portion 331 of a lever 300 is arranged on the Z-direction side relative to an electromagnetic coil 110 of a magnetic attractor 100, not relative to any of the yokes of the magnetic attractor 100. The actuator A3 will now be described focusing on the difference from the actuator A1 and omitting overlapping descriptions.

The magnetic attractor 100 may include none of the first to fifth yokes 130 to 170 of any of the above aspects (see FIG. 9), or include at least one of the first to fifth yokes 130 to 170 of any of the above aspects.

Where all the first to fifth yokes 130 to 170 are omitted, a first displaceable portion 321 of the lever 300 may be arranged on the Y-direction side relative to the electromagnetic coil 110, with a gap therebetween. In other cases, the first displaceable portion 321 may be arranged in the same manner as the first displaceable portion 321 of the actuator A1.

The second displaceable portion 331 of the lever 300 is arranged on the Z-direction side relative to the electromagnetic coil 110. When the first displaceable portion 321 is magnetically attracted by the magnetic attractor 100 and displaced in the Y' direction and the lever 300 accordingly makes the first pivotal movement, this causes the second displaceable portion 331 to be displaced in the Z direction, away from the electromagnetic coil 110. When the lever 300 makes the second pivotal movement, this causes the second displaceable portion 331 to be displaced in the Z' direction, toward the electromagnetic coil 110.

The actuator A3 is downsized for the following reasons. The second displaceable portion 331 is arranged on the Z-direction side relative to the electromagnetic coil 110. In other words, the second displaceable portion 331 is so arranged as to overlap the electromagnetic coil 110 in the Z-Z' direction, resulting in the reduced dimension in the Y-Y' direction of the actuator A3. Further, the actuator A3 provides the same effects as the second and third technical features and effects of the actuator A1.

The vibration application mechanism M may be configured as described above, except that the actuator A1 is replaced by the actuator A3 of any of the above aspects. This vibration application mechanism M also provides the same technical features and effects as described above.

The electromagnetic actuators and the vibration application mechanisms of the invention are not limited to the above-described embodiments, but may be modified as appropriate within the scope of the claims. The details are described below.

The fifth yoke 170 described above may be provided together with the protrusion 131 of the first yoke 130. In this case, the fifth yoke 170 may be generally ring-shaped, arranged on the Y-direction side relative to the first to fourth portions 111 to 114 of the electromagnetic coil 110, and have the protrusion 131 disposed therein. In this case, the second displaceable portion 331 may be arranged on the Z-direction side relative to the fifth yoke 170 or the electromagnetic coil 110. The protector 220 may be provided between the second displaceable portion 331 and the fifth yoke 170, or between the second displaceable portion 331 and the electromagnetic coil 110.

The lever of the invention may be modified in any manner as long as the lever includes a fulcrum portion pivotally supported by the support of the frame of any of the above aspects, a first displaceable portion constituted at least partly by a magnetic substance and arranged on the Z'-direction side relative to the fulcrum portion and on the Y-direction side relative to the magnetic attractor of any of the above aspects, and a second displaceable portion arranged on the Y'-direction side relative to the fulcrum portion and on the Z-direction side relative to the magnetic attractor. For example, the lever 300 may be a plate with a fan-shaped cut-out. A first edge of the cut-out may be located on the Z-direction side relative to the magnetic attractor 100 of any of the above aspects and include the second displaceable portion 331, and a second edge of the cut-out may be located on the Y-direction side relative to the magnetic attractor 100 of any of the above aspects and include the first displaceable portion 321.

The actuator A1, A2, and/or A3 described above may include a biasing portion in place of the buffer C. This biasing portion may be provided between the second displaceable portion 331 and at least one of the magnetic attractor 100 or the frame 200, and may be configured to bias the second displaceable portion 331 in the Z' direction. In this case, the first pivotal movement of the lever 300 is made against the biasing force of the biasing portion, and the second pivotal movement of the lever 300 is caused by the biasing force of the biasing portion such that the second displaceable portion 331 is displaced in the Z' direction.

The above vibratable part V may be any member configured to be intermittently pressed (vibrated), either directly or indirectly via the pressor, by the actuator A1, A2, or A3 in a manner as described above. For example, the vibratable part may be a push switch or other device.

The vibration application mechanism M described above may include a plurality of actuators A1, A2, and/or A3 of any of the above aspects.

REFERENCE SIGNS LIST

A1, A2, A3: Electromagnetic actuator
100: Magnetic attractor
110: Electromagnetic coil
111, 112, 113, 114: First portion, second portion, third portion, fourth portion
120: Coil bobbin
130: First yoke
131: Protrusion
140: Second yoke
150: Third yoke
160: Fourth yoke
170: Fifth yoke
200: Frame
210: Frame body
211, 212, 213: First abutment, second abutment, coupling portion
220: Protector
230: Support
231: Support hole
300: Lever
310: Fulcrum portion
311: Through hole
S: Shaft
320: First arm
321: First displaceable portion
321a, 321b: Magnetic body, buffer
330: Second arm
331: Second displaceable portion
400: Mounting portion
410, 420, 430: First abutment, second abutment, coupling portion
C: Buffer
L1, L2: First distance, second distance
M: Vibration application mechanism
V: Vibratable part
10: Touch sensor
20: Operation panel
30: Vibratable plate

What is claimed is:
1. An electromagnetic actuator comprising:
a magnetic attractor configured to exert a magnetic attractive force in one side in a first direction, the magnetic attractor including
an electromagnetic coil, and
a yoke extending in the first direction, the yoke including a protrusion located on the other side in the first direction relative to the electromagnetic coil;
a frame including
a frame body fixed to the magnetic attractor, and
a support located on an oblique-direction side relative to the magnetic attractor, the oblique direction including components of the other side in the first direction and one side in a second direction, the second direction being orthogonal to the first direction; and
a lever including
a fulcrum portion pivotally supported by the support of the frame,
a first displaceable portion constituted at least partly by a magnetic substance, the first displaceable portion being arranged on the other side in the second direction relative to the fulcrum portion and on the other side in the first direction relative to the protrusion of the yoke, and
a second displaceable portion arranged on the one side in the first direction relative to the fulcrum portion, entirely arranged on the one side in the second direction relative to the protrusion, and entirely arranged on the other side in the first direction relative to the electromagnetic coil, wherein the first displaceable portion is configured to be magnetically attracted by the magnetic attractor and displaced to the one side in the first direction to cause the lever to make a first pivotal movement about the fulcrum portion, and to cause the second displaceable portion to make a displacement to the one side in the second direction, away from at least one of the magnetic attractor or the frame.

2. The electromagnetic actuator according to claim 1, wherein a first distance is larger than a second distance, where the first distance is a distance from a central axis of the fulcrum portion to an end on the other side in the second direction of the first displaceable portion, and the second distance is a distance from the central axis of the fulcrum portion to an end on the one side in the first direction of the second displaceable portion.

3. The electromagnetic actuator according to claim 1, wherein the frame further includes a protector located between the yoke and the second displaceable portion.

4. The electromagnetic actuator according to claim 1, wherein
the frame further includes a protector located between the support and the electromagnetic coil in the first direction, and
the second displaceable portion is arranged on the one side in the second direction relative to the protector and on the other side in the first direction relative to the electromagnetic coil.

5. The electromagnetic actuator according to claim 2, wherein
the frame further includes a protector located between the support and the electromagnetic coil in the first direction, and
the second displaceable portion is arranged on the one side in the second direction relative to the protector and on the other side in the first direction relative to the electromagnetic coil.

6. The electromagnetic actuator according to claim 1, wherein
the first displaceable portion is arranged on the other side in the first direction relative to the electromagnetic coil.

7. The electromagnetic actuator according to claim 2, wherein
the first displaceable portion is arranged on the other side in the first direction relative to the electromagnetic coil.

8. The electromagnetic actuator according to claim 6, wherein
the second displaceable portion is arranged on the one side in the second direction relative to the electromagnetic coil, and
the frame includes a protector located between the electromagnetic coil and the second displaceable portion.

9. The electromagnetic actuator according to claim 7, wherein
the second displaceable portion is arranged on the one side in the second direction relative to the electromagnetic coil, and
the frame includes a protector located between the electromagnetic coil and the second displaceable portion.

10. A vibration application mechanism comprising:
the electromagnetic actuator according to claim 1; and
a vibratable part, wherein
the electromagnetic actuator is configured such that the first displaceable portion is magnetically attracted intermittently by the magnetic attractor to intermittently cause the first pivotal movement of the lever and the displacement of the second displaceable portion, and such that the second displaceable portion directly or indirectly presses the vibratable part from the other side in the second direction to apply vibration to the vibratable part.

11. The vibration application mechanism according to claim 10, configured such that, when the magnetic attractor has ceased to exert the magnetic attraction, the vibratable part directly or indirectly presses the second displaceable portion from the one side in the second direction so that the second displaceable portion moves back to the other side in the second direction, the lever makes a second pivotal movement about the fulcrum portion in a direction opposite to the first pivotal movement, and the first displaceable portion moves back to the other side in the first direction.

12. The vibration application mechanism according to claim 10, further comprising a pressor interposed between the vibratable part and the second displaceable portion.

13. The vibration application mechanism according to claim 11, further comprising a pressor interposed between the vibratable part and the second displaceable portion.

14. The vibration application mechanism according to claim 12, wherein
the pressor is an elastic body, and
the vibration application mechanism is configured such that when the first displaceable portion is magnetically attracted by the magnetic attractor, the second displaceable portion makes the displacement so as to compress the pressor between the vibratable part and the second displaceable portion, and when the magnetic attractor has ceased to exert the magnetic attraction, the pressor restores itself, the second displaceable portion moves back to the other side in the second direction, the lever makes a second pivotal movement about the fulcrum portion in a direction opposite to the first pivotal movement, and the first displaceable portion moves back to the other side in the first direction.

15. The vibration application mechanism according to claim 13, wherein
the pressor is an elastic body, and
the vibration application mechanism is configured such that when the first displaceable portion is magnetically attracted by the magnetic attractor, the second displaceable portion makes the displacement so as to compress the pressor between the vibratable part and the second displaceable portion, and when the magnetic attractor has ceased to exert the magnetic attraction, the pressor restores itself, the second displaceable portion moves back to the other side in the second direction, the lever makes a second pivotal movement about the fulcrum portion in a direction opposite to the first pivotal movement, and the first displaceable portion moves back to the other side in the first direction.

16. The vibration application mechanism according to claim 10, wherein
the vibratable part includes a touch sensor, and
the second displaceable portion has an amount of displacement of 0.3 mm or less.

17. An electromagnetic actuator comprising:
a magnetic attractor configured to exert a magnetic attractive force in one side in a first direction; the magnetic attractor including
an electromagnetic coil, and
a yoke arranged on the other side in the first direction relative to the electromagnetic coil;

a frame including
   a frame body fixed to the magnetic attractor, and
   a support located on an oblique-direction side relative to the magnetic attractor, the oblique direction including components of the other side in the first direction and one side in a second direction, the second direction being orthogonal to the first direction; and a lever including
   a fulcrum portion pivotally supported by the support of the frame,
   a first displaceable portion constituted at least partly by a magnetic substance, the first displaceable portion being arranged on the other side in the second direction relative to the fulcrum portion and on the other side in the first direction relative to the yoke, and
   a second displaceable portion arranged on the one side in the first direction relative to the fulcrum portion, entirely arranged on the one side in the second direction relative to the yoke, and entirely arranged on the other side in the first direction relative to the electromagnetic coil, wherein the first displaceable portion is configured to be magnetically attracted by the magnetic attractor and displaced to the one side in the first direction to cause the lever to make a first pivotal movement about the fulcrum portion, and to cause the second displaceable portion to make a displacement to the one side in the second direction, away from at least one of the magnetic attractor or the frame.

18. The electromagnetic actuator according to claim 17, wherein, a first distance is defined as a distance from a central axis of the fulcrum portion to an end on the other side in the second direction of the first displaceable portion, a second distance is defined as a distance from the central axis of the fulcrum portion to an end on the one side in the first direction of the second displaceable portion, and the first distance is larger than the second distance.

* * * * *